United States Patent
Chen et al.

(10) Patent No.: US 12,507,281 B2
(45) Date of Patent: Dec. 23, 2025

(54) CHANNEL OCCUPANCY TIME SHARING FOR FRAME-BASED EQUIPMENT

(71) Applicant: QUALCOMM Incorporated, San Diego, CA (US)

(72) Inventors: Siyi Chen, Beijing (CN); Changlong Xu, Beijing (CN); Jing Sun, San Diego, CA (US); Xiaoxia Zhang, San Diego, CA (US); Hao Xu, Beijing (CN); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 18/004,049

(22) PCT Filed: Sep. 2, 2020

(86) PCT No.: PCT/CN2020/112980
§ 371 (c)(1),
(2) Date: Dec. 30, 2022

(87) PCT Pub. No.: WO2022/047650
PCT Pub. Date: Mar. 10, 2022

(65) Prior Publication Data
US 2023/0269772 A1 Aug. 24, 2023

(51) Int. Cl.
*H04W 72/1268* (2023.01)
*H04W 72/23* (2023.01)
(Continued)

(52) U.S. Cl.
CPC ... *H04W 74/0816* (2013.01); *H04W 72/1268* (2013.01); *H04W 72/23* (2023.01); *H04W 74/0866* (2013.01); *H04W 76/20* (2018.02)

(58) Field of Classification Search
None
See application file for complete search history.

(56) References Cited

U.S. PATENT DOCUMENTS 10,624,125 B2   4/2020  Yerramalli et al.
2018/0115347 A1* 4/2018  Yerramalli ........ H04W 74/0808
(Continued)

FOREIGN PATENT DOCUMENTS

CN    106171036 A   11/2016
CN    110062464 A    7/2019
(Continued)

OTHER PUBLICATIONS

Qualcomm, uplink enhancements for URLLC in unlicensed controlled environments, 3GPP TSG RAN WG1 Meeting #102-e, Agenda Item 8.3.2, R1-2006801, Aug. 17-28, 2020.*
(Continued)

*Primary Examiner* — Benjamin Lamont
(74) *Attorney, Agent, or Firm* — Harrity & Harrity LLP

(57) ABSTRACT

Wireless communication systems and methods related to channel occupancy time (COT) sharing when operating in a frame-based-equipment (FBE) mode over a shared frequency band are provided. In one aspect, a user equipment (UE) contends for a channel occupancy time (COT) in a first frame-based equipment (FBE) frame. The UE transmits, to a base station (B S), an uplink communication signal during a first portion of the COT. The UE receives, from the BS based on COT sharing information, a downlink communication signal during a second portion of the COT, wherein the second portion is non-overlapping with the first portion.

35 Claims, 12 Drawing Sheets

(51) Int. Cl.
*H04W 74/08* (2009.01)
*H04W 74/0816* (2024.01)
*H04W 76/20* (2018.01)

(56) References Cited

U.S. PATENT DOCUMENTS

| | | | |
|---|---|---|---|
| 2020/0053798 | A1 | 2/2020 | Tsai et al. |
| 2020/0187250 | A1 | 6/2020 | Bhattad et al. |
| 2020/0229157 | A1 | 7/2020 | Rastegardoost et al. |
| 2021/0195643 | A1* | 6/2021 | Talarico ............ H04W 74/0816 |
| 2022/0167407 | A1* | 5/2022 | Oviedo ............ H04W 72/0446 |
| 2022/0167413 | A1* | 5/2022 | Myung ............ H04W 74/0816 |
| 2022/0322425 | A1* | 10/2022 | He ..................... H04W 74/0808 |
| 2023/0189334 | A1* | 6/2023 | He ....................... H04W 72/56 370/329 |

FOREIGN PATENT DOCUMENTS

| | | |
|---|---|---|
| CN | 110831179 A | 2/2020 |
| WO | 2018081101 A2 | 5/2018 |
| WO | 2020168320 A1 | 8/2020 |
| WO | 2020169071 A1 | 8/2020 |

OTHER PUBLICATIONS

Ericsson, Summary #5 on enhancements for unlicensed band URLLC/IoT for R17, 3GPP TSG RAN WG1 Meeting #102-e, Agenda Item 8.3.2, R1-2007391, Aug. 17-28, 2020.*

Nokia, et al., "Feature Lead's Summary #2 on Channel Access Procedures", 3GPP TSG RAN WG1 Meeting #99, R1-1913517, Reno, US, Nov. 18-22, 2019, Nov. 26, 2019, 28 Pages.

VIVO: "Feature Lead Summary on Configured Grant Enhancement", 3GPP TSG RAN WG1#99, R1-1912016, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 19, 2019, 19 Pages, XP051826593, section 4, p. 7-p. 8.

VIVO: "Discussion on the Enhancements to Configured Grants", 3GPP TSG RAN WG1 #99, R1-1912015, Nov. 22, 2019, 10 pages, The whole document.

Apple Inc: "On Channel Access Mechanisms for Unlicensed Access above 52.6 Ghz", 3GPP TSG RAN WG1 #102-e, e-Meeting, Aug. 17-28, 2020, R1-2006513, Aug. 28, 2020, the Whole Document, 8 Pages.

International Search Report and Written Opinion—PCT/CN2020/112980—ISA/EPO—May 31, 2021.

Qualcomm Incorporated: "TxOP Frame Structure for NR Unlicensed," 3GPP Draft, R1-1804829, 3GPP TSG RAN WG1 Meeting #92bis, 7.6.2 Frame Structure for NR-U Operation, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 20, 2018, Apr. 15, 2018, XP051427095, 8 Pages, p. 2, lines 4-14 section 4; pp. 6-7 figure 9, the Whole Document.

Qualcomm Incorporated: "Summary of NR-U Agreements till RAN1 #99", 3GPP TSG RAN WG1 Meeting #99, R1-1913599, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Jan. 8, 2020, 40 Pages, XP051843030.

Supplementary European Search Report—EP20951898—Search Authority—The Hague—Apr. 2, 2024.

* cited by examiner

CHANNEL OCCUPANCY TIME SHARING FOR FRAME-BASED EQUIPMENT

CROSS-REFERENCE TO RELATED APPLICATIONS

The present application is a 35 U.S.C. 371 National Phase entry of Patent Cooperation Treaty (PCT) Application No. PCT/CN2020/112980, filed Sep. 2, 2020, which is hereby expressly incorporated herein by reference in its entirety.

TECHNICAL FIELD

This application relates to wireless communication systems and methods, and more particularly to systems and methods for channel occupancy time (COT) sharing when operating in a frame-based-equipment (FBE) mode over a shared frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may schedule a UE for UL and/or DL communications via a dynamic scheduling or a configured grant (CG) procedure. For dynamic scheduling, the BS may transmit a scheduling assignment or grant to schedule the UE for each and every UL transmission and/or each and every DL transmission. There are two types of CG-based scheduling, a type 1 and a type 2 CG-based scheduling. For type 1 CG-based scheduling, the BS may preconfigure the UE with a CG configuration indicating an allocated resource and a periodicity for the allocated resource and the UE may transmit in any of the CG resources without having to receive a specific scheduling assignment from the BS. For type 2 CG-based scheduling, the BS may preconfigure the UE with a CG configuration indicating a periodicity. The UE may not utilize the CG-based schedule until the BS activates the CG configuration. The BS may activate the CG configuration by indicating a resource allocation for the CG-based schedule. Once activated, the resource allocation may repeat according to the preconfigured periodicity. As use cases and diverse deployment scenarios continue to expand in wireless communication, CG-based transmission technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present application describes mechanisms for channel occupancy time (COT) sharing over a shared radio frequency band (e.g., in an unlicensed spectrum or a shared spectrum). For example, a user equipment (UE) may contend for a channel occupancy time (COT), which may include performing a listen-before-talk (LBT) procedure to determine if a CG resource is available to the UE. If the LBT passes, the UE acquires the COT and transmits an uplink communication signal (e.g., configured grant physical uplink shared channel (CG-PUSCH)) to the BS. The acquired COT can be shared with the BS based on COT sharing information, whereby the UE receives a downlink communication signal (e.g., physical downlink shared channel (PDSCH)) during a shared portion of the COT.

According to one aspect of the present disclosure, a method of wireless communication performed by a user equipment (UE) includes: contending for a channel occupancy time (COT) in a first frame-based equipment (FBE) frame; transmitting, to a base station (BS), an uplink communication signal during a first portion of the COT; and receiving, from the BS based on COT sharing information, a downlink communication signal during a second portion of the COT, wherein the second portion is non-overlapping with the first portion.

According to another aspect of the present disclosure, a method of wireless communication performed by a base station (BS) includes: receiving, from a user equipment (UE), an uplink communication signal during a first portion of a COT, the COT being associated with the UE and within a first frame-based equipment (FBE) frame; and transmitting, to the UE based on COT sharing information, a downlink communication signal during a second portion of the COT, wherein the second portion is non-overlapping with the first portion.

According to another aspect of the present disclosure, a user equipment (UE) includes a processor and a transceiver. The processor is configured to contend for a channel occupancy time (COT) in a first frame-based equipment frame. The transceiver is configured to: transmit, to a base station (BS), an uplink communication signal during a first portion of the COT; and receive, from the BS based on COT sharing information, a downlink communication signal during a second portion of the COT, wherein the second portion is non-overlapping with the first portion.

According to another aspect of the present disclosure, a BS includes a transceiver configured to: receive, from a user equipment (UE), an uplink communication signal during a first portion of a COT, the COT being associated with the UE and within a first frame-based equipment (FBE) frame; and transmit, to the UE based on COT sharing information, a downlink communication signal during a second portion of the COT, wherein the second portion is non-overlapping with the first portion.

According to another aspect of the present disclosure, a non-transitory computer-readable medium has program code recorded thereon. The program code includes: code for causing a user equipment (UE) to contend for a channel occupancy time (COT) in a first frame-based equipment (FBE) frame; code for causing the UE to transmit, to a base station (BS), an uplink communication signal during a first portion of the COT; and code for causing the UE to receive, from the BS based on COT sharing information, a downlink communication signal during a second portion of the COT, wherein the second portion is non-overlapping with the first portion.

According to another aspect of the present disclosure, a non-transitory computer-readable medium has program code recorded thereon. The program code includes: code for causing a base station (BS) to receive, from a user equipment (UE), an uplink communication signal during a first portion of a COT, the COT being associated with the UE and within a first frame-based equipment (FBE) frame; and code for causing the BS to transmit, to the UE based on COT sharing information, a downlink communication signal during a second portion of the COT, wherein the second portion is non-overlapping with the first portion.

According to another aspect of the present disclosure, a user equipment (UE) includes: means for contending for a channel occupancy time (COT) in a first frame-based equipment (FBE) frame; means for transmitting, to a base station (BS), an uplink communication signal during a first portion of the COT; and means for receiving, from the BS based on COT sharing information, a downlink communication signal during a second portion of the COT, wherein the second portion is non-overlapping with the first portion.

According to another aspect of the present disclosure, a base station (BS) includes: means for receiving, from a user equipment (UE), an uplink communication signal during a first portion of a COT, the COT being associated with the UE and within a first frame-based equipment (FBE) frame; and means for transmitting, to the UE based on COT sharing information, a downlink communication signal during a second portion of the COT, wherein the second portion is non-overlapping with the first portion.

Other aspects and features aspect of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
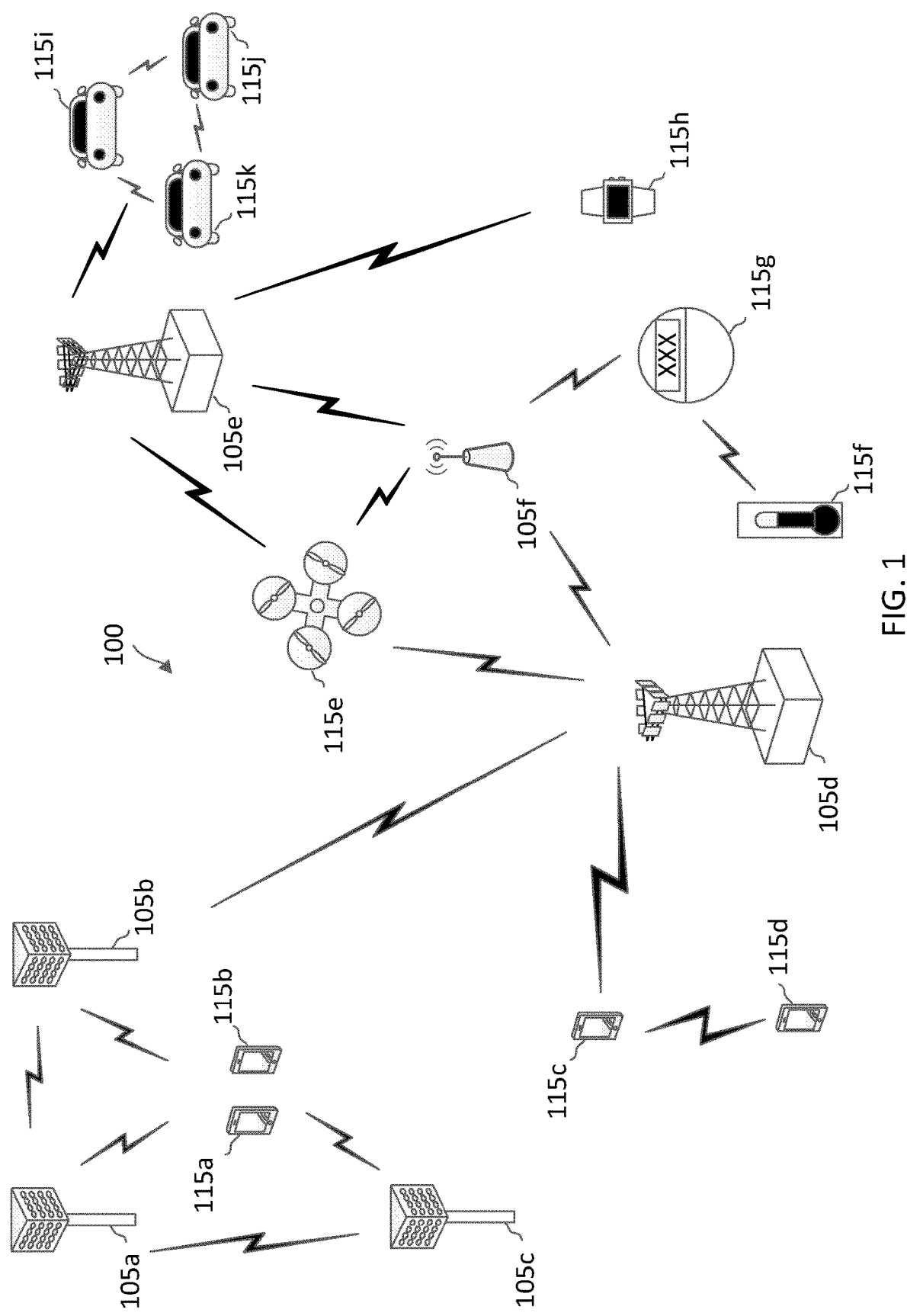
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Some studies have been conducted for NR-U deployment over a 5 gigahertz (GHz) band to support enhanced mobile broadband (eMBB). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. The addition of these bands also presents opportunities for internet of things (IOT) scenarios, such as industrial IOT (IIOT) scenarios in which a large number of UEs are present. In some instances, it may be desirable to enable URLLC between IIOT UEs in shared and/or unlicensed frequencies.

There are two approaches, load-based equipment (LBE) and frame-based equipment (FBE), to channel access over an unlicensed band or a shared frequency band. LBE utilizes a dynamic channel access configuration. For instance, a node (e.g., a BS or a UE) operating in an LBE mode may perform LBT at any time instant. If the channel is busy, the node may perform a random back-off and may perform LBT again after the random back-off. In contrast, FBE utilizes a semi-static channel access configuration. For instance, a node (e.g., a BS or a UE) operating in an FBE mode may perform LBT at fixed time instants. If the channel is busy, the node may back off for a fixed time period and may perform LBT again after the fixed time period. In other words, an FBE frame structure may include periodic fixed frame periods (FFPs), which may also be referred to as FBE frames. Each FFP includes an idle period at an end of the FFP. A node may perform an LBT during an idle period to contend for a COT in a following FFP.

In some aspects, a network may provision for URLLC over a shared frequency band or an unlicensed band using an FBE mode for channel access. For instance, FBE mode may be suitable when the network operates in an isolated environment or controlled environment (e.g., with no nearby WiFi node). When operating in an FBE mode, a channel occupancy time (COT) is typically initiated or acquired by a BS. After acquiring a COT, the BS may schedule a UE for UL and/or DL transmission during the COT. In some instances, the UE may transmit an UL communication signal to the BS in an FFP upon detecting a DL transmission (e.g., physical downlink control channel (PDCCH), synchronization signal block (SSB), physical broadcast channel (PBCH), remaining minimum system information (RMSI), group common (GC)-PDCCH signals, and/or the like) from the BS in the FFP (indicating the BS had acquired the COT in the FFP). However, in some situations, it may be desirable for a UE to initiate or acquire a COT and communicate with the BS, for example, to reduce transmission latency for URLLC traffic. In this regard, a BS may configure a UE with a configured grant (CG) indicating periodic CG resources in which the UE may use to transmit UL transmission to the BS. The UE may use any of the CG resources to transmit without having to receive a specific scheduling assignment from the BS. The UE may perform an LBT to contend for a COT prior to transmitting in the CG resource. Because of the FFPs used by FBE, once the UE wins a COT, the COT duration is fixed based on the FFP. However, the UE may utilize only a small fraction of the COT duration for a UL transmission. In other words, remaining COT duration is available and unused.

The present disclosure describes aspects of UE-initiated COT acquisition with COT sharing in a CG scenario. In some aspects of the present disclosure, a UE contends for a COT and shares a portion of the COT with the BS. When a UE using FBE has data to transmit to a BS, the UE may perform a listen-before-talk (LBT) procedure during an idle period of an FFP to contend for a COT in a next FFP. The LBT may include performing one or more clear channel assessments (CCAs) which includes obtaining one or more signal energy or power measurement(s) and comparing the measurement(s) to an ED threshold. If the LBT fails, the UE can attempt to perform an LBT again at a next idle period. If the LBT passes, the UE acquires the COT and can transmit uplink communication signals, such as a configured grant physical uplink shared channel (CG-PUSCH) communication, to the BS. COT sharing of the UE-acquired COT is enabled to allocate a portion of the acquired COT back to the BS for downlink transmissions. The COT sharing information may be determined by the UE and sent to the BS in an uplink communication signal, such as a CG-PUSCH signal including CG-UCI (carrying the COT sharing information). Alternatively, the COT sharing information may be configured by the BS and indicated in a downlink communication signal, which may include a radio resource control (RRC) signal and/or downlink control information (DCI) carrying the COT sharing information In some aspects, COT sharing information may include a UL-to-DL COT sharing ED threshold, a duration, and/or an offset. The UL-to-DL COT sharing ED threshold may be used by the UE to contend for a COT for sharing with the BS. For instance, the UE may use the threshold during an LBT to determine whether the channel is busy or available. The duration may indicate a duration or an end of a sharing portion in a UE's COT. The offset may indicate the starting of a sharing portion in a UE's COT.

Aspects of the present disclosure advantageously allow an FBE-based UE to contend for and acquire COTs, thereby providing flexibility to support CG-based transmissions. Further, the present disclosure provides UE-initiated COT sharing in a variety of configurations, including configurations in which CG-UCI is included in CG-PUSCH communications, and when CG-UCI is not included. For instance, a UE indicating COT sharing information in CG-UCI "piggyback" on a CG-PUSCH transmission provides flexibility for the UE in sharing a COT of the UE. Alternatively, a BS configuring a UE with COT sharing information allows the BS to have better control in sharing a COT of the UE and/or a better view of resource utilization and scheduling.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PDSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4)

LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

Figure 2:
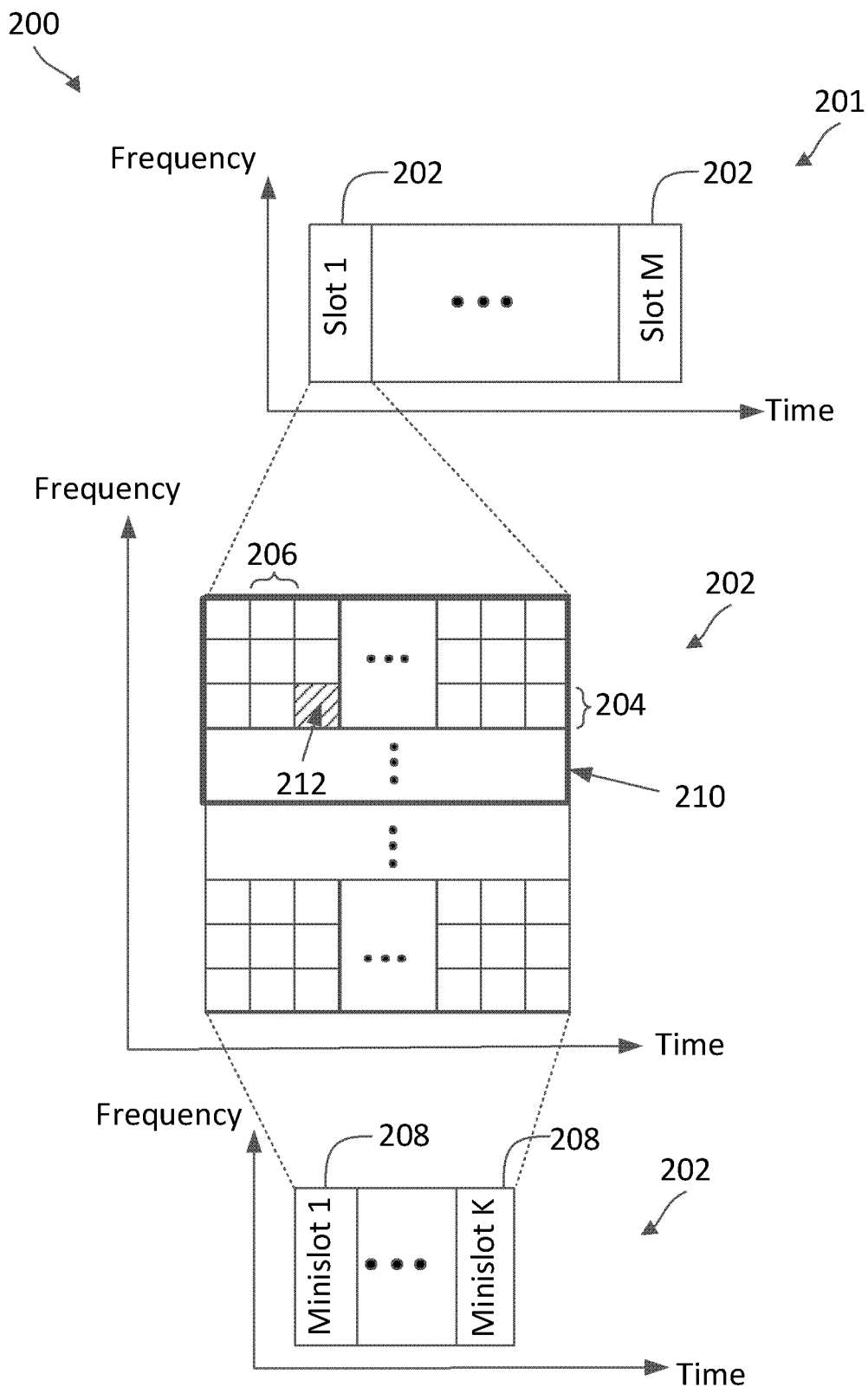
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
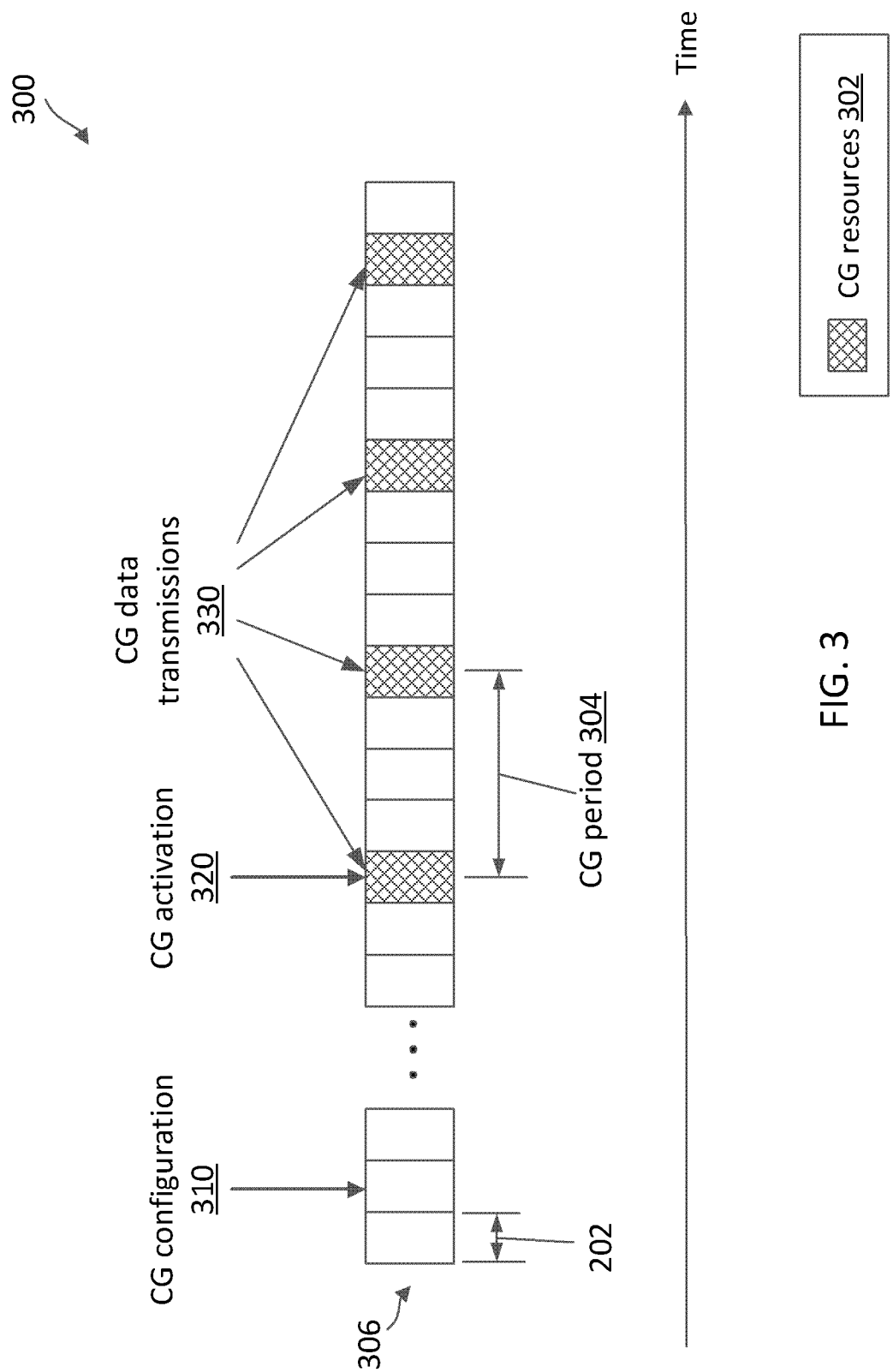
FIG. 3 is a timing diagram illustrating a configured grant (CG)-based communication scenario according to some aspects of the present disclosure.

FIG. 3 illustrates a CG-based communication scenario 300 according to some aspects of the present disclosure. The x-axis represents time in some arbitrary units. The scenario 300 can include a frame structure 306 that may be employed and/or configured by a BS (such as BS 105) for the transmission of data from a UE (such as UE 115) in a network (such as the network 100) using CG resources. The frame structure 306 may include multiple slots 202.

In the scenario 300, a BS 105 may configure a UE 115 with a CG configuration 310, for example, via radio resource control (RRC) signaling. The CG configuration 310 may indicate a periodicity (e.g., shown by the CG period 304) for a CG-base schedule and a CS-RNTI. In some instances, when HARQ is applied, the CG configuration 310 may also indicate a HARQ ID identifying a HARQ process associated with the CG configuration. After receiving the CG configuration 310, the UE 115 may monitor for a PDCCH DCI message based on the CS-RNTI. For instance, the BS 105 may have configured the UE 115 with a PDCCH monitoring occasions, and the UE 115 may perform the PDCCH DCI monitoring according to the PDCCH monitoring occasions. To activate the CG configuration 310, the BS 105 may transmit a CG activation 320, for example, via a PDCCH DCI message during one of the PDCCH monitoring occasions. The BS 105 may include in the DCI message a CRC scrambled with the CS-RNTI. The CG activation 320 may indicate a resource allocation (e.g., certain RB(s) 210 in certain symbol(s) 206 within a certain slot 202). The CG activation 320 may also indicate transmission parameters (e.g., MCS) to be used for the CG transmissions. Once activated, the resource allocation is repeated according to the periodicity configured by the CG configuration 310. It may not be necessary for the BS 105 to transmit a PDCCH DCI scheduling grant per transmission. As such, CG-based scheduling can reduce PDCCH overhead.

In the illustrated example of FIG. 3, the CG resources 302 associated with the configuration 310 is shown by the patterned filled boxes. The CG resources 302 are periodic repeating at every CG period 304 (e.g., about five slots 202). In some instances, the CG resources 302 may also be referred to as CG instances. Although FIG. 3 illustrates the CG configuration 310 configures a CG schedule periodicity of five slots 202, it should be understood that in other examples a CG schedule can have a shorter period or a longer period. Additionally, in some other aspects, the CG configuration 310 may additionally indicate a location of a CG resource 302 (e.g., via an offset relative to a certain reference radio frame) and the CG resources 302 may be activated upon the configuration. In this way, the BS may not transmit the CG activation 320.

In some aspects, the CG configuration 310 may be configured for UL communications. Accordingly, the UE 115 can transmit a data transmission 330 (e.g., PUSCH transmission) to the BS 105 in each CG resource 302, and the BS 105 can monitor for a data transmission from the UE 115 in each of the CG resources 302. The monitoring may include performing blind packet decoding in each CG resource 302.

Figure 4:
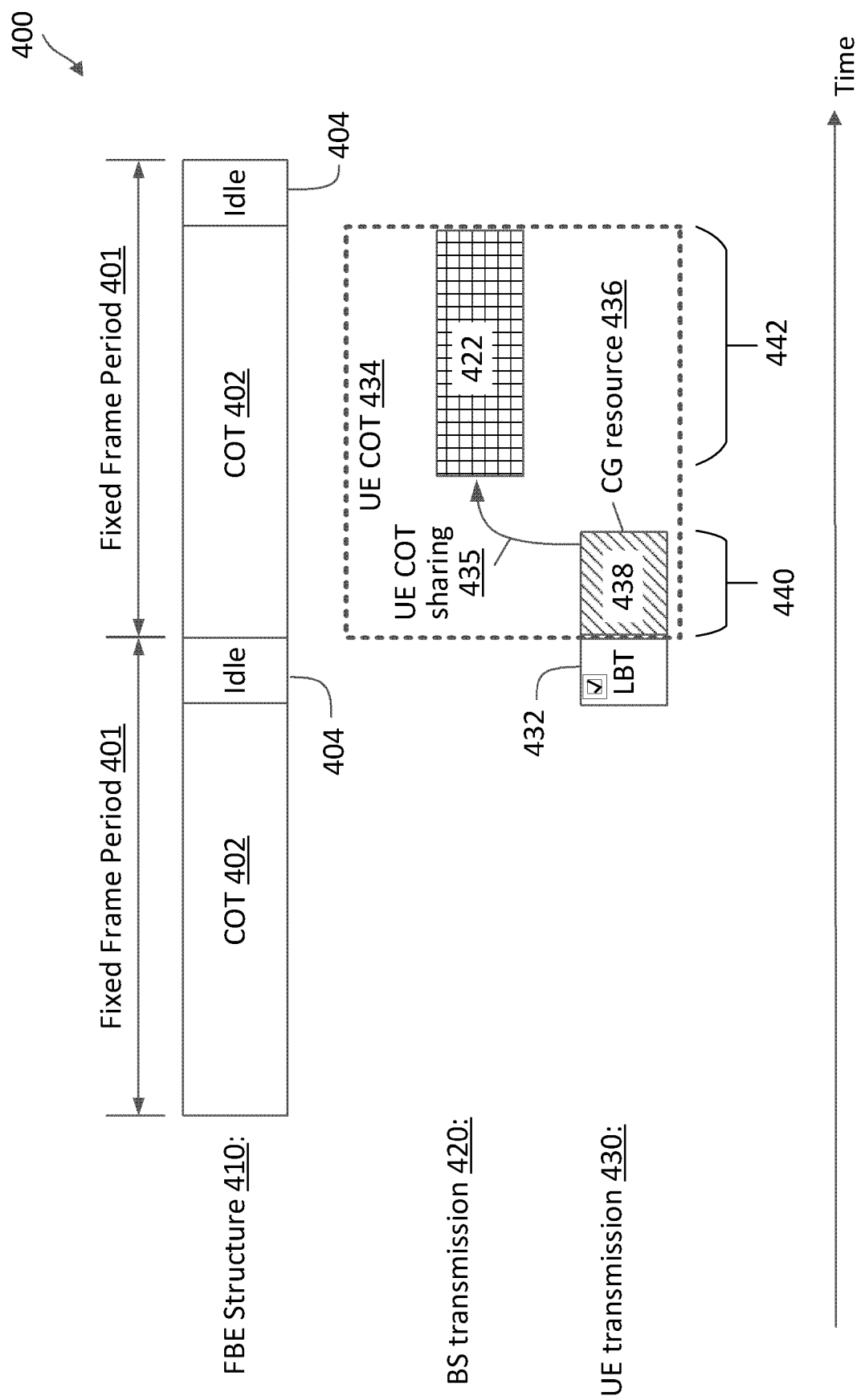
FIG. 4 is a timing diagram illustrating a channel occupancy time (COT) sharing communication scenario for operations in a frame-based equipment (FBE) mode according to some aspects of the present disclosure.

FIG. 4 illustrates an FBE mode communication scenario 400 that includes an FBE frame structure 410 and a COT sharing scenario, according to some aspects of the present disclosure. The structure 410 may be employed by BSs such as the BSs 105 and/or UEs such as the UEs 115 in a network such as the network 100 for communications. In particular, the BS may communicate with the UE in an FBE mode, for example, over a shared radio frequency band in an unlicensed spectrum or shared spectrum, using the structure 410. The structure 410 may be used in various scenarios, including industrial internet of things (IIOT) and/or URLLC scenarios. In FIG. 4, the x-axis represents time in some arbitrary units. The structure 410 may be employed in conjunction with the structure 200.

As shown, the frame structure 410 includes a plurality of FFPs 401 (e.g., in a shared radio frequency band). Each FFP 401 includes a COT 402 and an idle period 404. The COT 402 may also be referred to as a transmission period. A BS 105 or a UE 115 may perform channel sensing or an LBT in the idle period 404 and may access the frequency during a COT 402 in a subsequent FFP 401. Although FIG. 4 illustrates the idle period 404 located at the end of the FFP 401, it should be understood that in other examples the idle period of an FFP can be located at the beginning of the FFP. In some aspects, some regulations may restrict the COT 402 to be no longer than 95% of the frame length (the duration of the FFP 401) and the idle period to be no shorter than 5% of the frame length. In some aspects, some regulations may restrict the idle period to be no longer than 100 microseconds (μs).

In some aspects, the BS 105 and/or the UE 115 may perform an LBT in an idle period 404 to gain access to COT 402 in a subsequent FFP 401. After gaining access to the COT 402, the BS 105 and/or the UE 115 may communicate multiple UL and/or DL communications in the COT 402 without another LBT. In some aspects, each FFP 401 is restricted to a duration of about 1 ms, 2 ms, 2.5 ms, 4 ms, 5 ms, or 10 ms. The starting positions of the FFPs 401 within every two radio frames (e.g., the radio frames 201) may start from an even radio frame and are given by $$i*P; i=\{0,1,\ldots,20/P-1\} \quad (1)$$

where P is a duration of an FFP 401.

In some aspects, the base station 105 notifies an FBE mode with the structure 410 to the UE 115, for example, in an RMSI filed indicated in a broadcast channel (BCH) payload. The FFP configuration may be included in System Information Block (SIB) Type 1. SIB1 may include information relevant for a UE to evaluate whether the UE is allowed to access a corresponding cell. Also, SIB1 may provide the UE 115 with the scheduling of other system information.

The frame structure 410 broadcasted by the BS 105 may be used to perform channel access by the UE 115 at fixed time instants (during idle periods 404 of the FFPs 401). The UE 115 may perform CCA during the idle period 404 to sense if the channel is available. If the channel is busy, the UE 115 may back off for a fixed period 402 and senses the channel again (in a next idle period 404) after the fixed period 402. In some instances, the UE 115 may measure the energy level during COT 402, and if the energy level is lower than a threshold and if the UE 115 detected the channel is idle, the UE 115 may start transmitting data immediately in the COT 402.

As mentioned above, in some aspects, it may be desirable to share a portion of a COT 402 acquired by a UE back to a BS. FIG. 4 shows a COT 402 acquired by the UE as a UE COT 434. The UE COT 434 includes a first portion 440 and a second portion 442. As shown by the UE transmission timeline 430, the UE may transmit an UL transmission 438 to the BS during the first portion 440. As shown by the BS transmission timeline 420, the UE shares the second portion 442 with the BS (shown by the arrow 435), where the BS transmits a DL transmission 422 during the second portion 442.

In the illustrated example of FIG. 4, the UE performs an LBT 432 in the idle period 404 to contend for channel access in a subsequent FFP 401. In an exemplary aspect, the LBT 432 is a CAT2 LBT. If the LBT 432 passes, the UE COT 434 acquires the COT 402 (which may be referred to as a UE COT 434) according to the FFP 401. In an example, the first portion 440 includes a CG resource 436. For instance, the BS may configure the UE with the CG resource 436, for example, using mechanisms as discussed above with respect to FIG. 3. Accordingly, upon winning the COT 434, the UE sends an uplink communication signal 438 in the CG resource 436 (during the first portion 440). The uplink communication signal 438 may include a physical uplink shared channel (PUSCH) signal, which may include uplink data and/or a reference signal. In some instances, the PUSCH signal may also include uplink control information (UCI) or any other suitable uplink communication signal.

After the uplink communication signal transmission 438 is complete, the remaining portion 422 (shared portion) of the UE COT 434 can be used by the BS for a downlink communication signal 422 according to a COT sharing configuration. The downlink communication signal 422 may include a physical downlink control channel (PDCCH), a physical downlink shared channel (PDSCH), or any other suitable downlink communication signal. As will be further explained below, in some aspects, the BS configures the UE COT sharing 436 such that there is an offset or gap between the first portion 440 and second portion 442. In other aspects, the second portion 442 begins at an end of the first portion 440.

In some aspects, a UE may initiate a COT based on a first ED threshold or a second ED threshold. In other words, the UE may perform an LBT and determine whether a channel status (busy or clear) by comparing channel signal energy measurements to the first ED threshold or the second ED threshold. The first ED threshold may be based on the UE maximum transmit power. The first ED threshold may be referred to as a normal ED threshold. If the UE applies the first ED threshold in an LBT and wins a COT based on the first ED threshold, the BS can share the COT for non-UE specific data, such as broadcast data or multicast data, and control transmission, in a shared portion (e.g., the portion 442) of the COT. A second ED threshold may be based on the BS maximum transmit power. The second ED threshold may be referred to as a new ED threshold or a COT sharing threshold. If the second ED threshold is used, the BS can share the COT for UE-specific data (unicast data destined to the UE sharing the COT). In some aspects, the UE may or may not be configured with both the first ED threshold and the second ED threshold. However, if the second ED threshold is configured, the UE may be mandated or configured to use the second ED threshold to initiate a COT.

Figure 5:
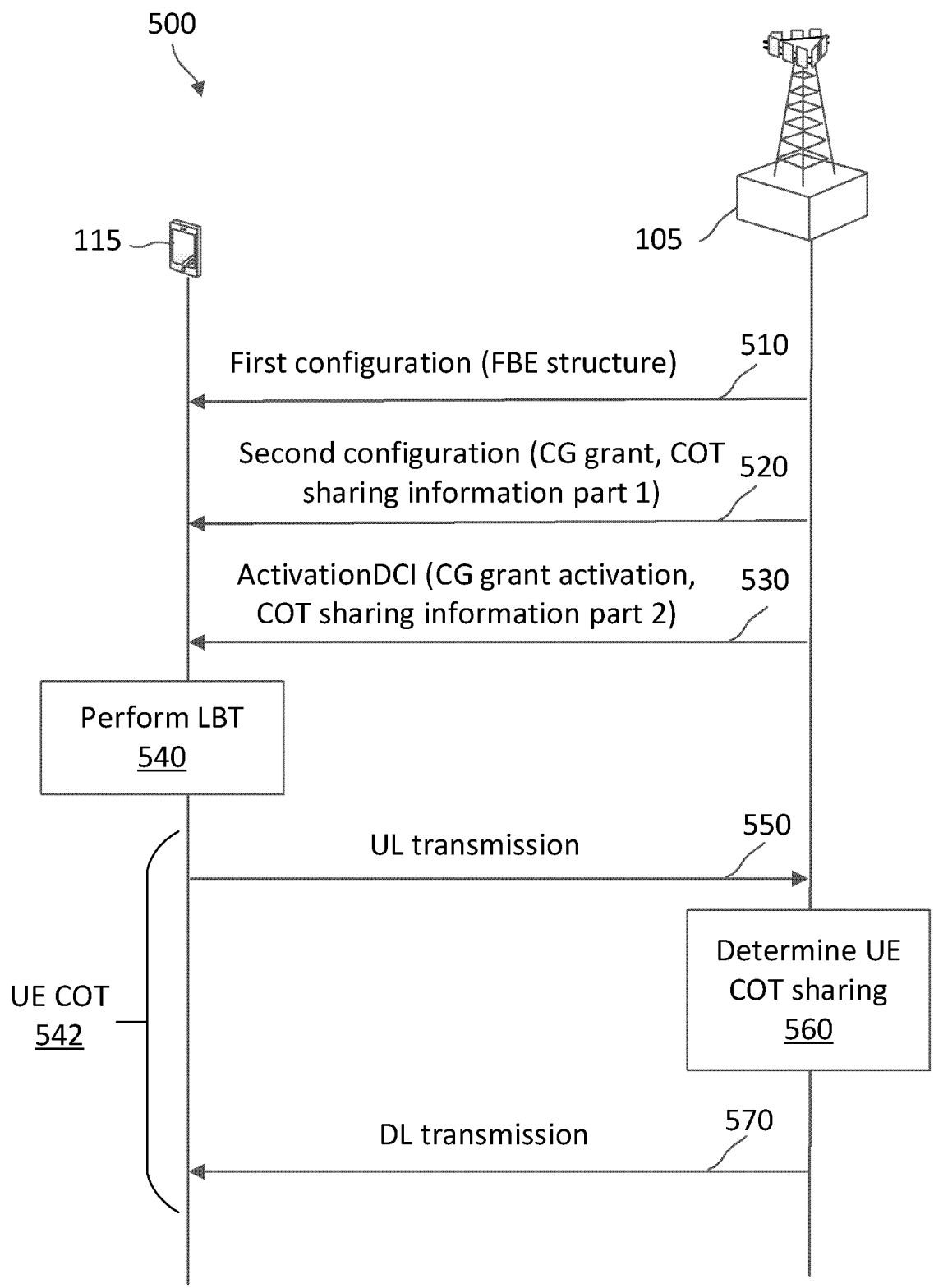
FIG. 5 is a sequence diagram of a user equipment (UE)-initiated COT communication scenario according to some aspects of the present disclosure.

FIG. 5 is a sequence diagram of a COT sharing method 500 between a BS 105 and a UE 115 in a configured grant (CG)-based communication scenario. For example, the BS 105 may utilize one or more components, such as the processor 1102, the memory 1104, the FBE-based UE COT sharing module 1108, the transceiver 1110, the modem 1112, and the one or more antennas 1116, to execute the steps or actions of the method 500. Similarly, the UE 115 may utilize one or more components, such as the processor 1202, the memory 1204, the FBE-based UE COT sharing module 1208, the transceiver 1210, the modem 1212, and the one or more antennas 1216, to execute the steps of the method 500. The COT sharing method is performed using a frame-based equipment (FBE) mode. In action 510, a first configuration signal indicating an FBE structure is transmitted from the BS 105 to the UE 115. The FBE structure may indicate a number of parameters of the FBE channel access configuration, such as a period or duration of the FBE frame (e.g., FFPs 401), the duration and/or location of an idle period within each FBE frame, time alignment of the FBE frames (e.g., with respect to a certain radio frame). In some aspects, the BS may transmit the first configuration signal in a system information block (SIB) message.

In action 520, a second configuration signal is transmitted from the BS 105 to the UE 115. The second configuration signal may indicate a CG, and COT sharing information. In some aspects, the BS 105 may transmit the second configuration signal via an RRC configuration. In some aspects, the second configuration signal may be performed similarly to the CG configuration 310 described with respect to FIG. 3.

In action 530, an activation signal is sent from the BS 105 to the UE 115. The activation signal indicates a CG grant activation, and additional COT sharing information. The activation signal may be included in downlink control information (DCI). In some aspects, the activation signal may be performed similarly to the CG activation 320 described with respect to FIG. 3. In some aspects, the DCI may be a format 0_1 and the COT sharing information may be indicated by reusing or overriding a 4-bit HARQ process ID field in the DCI format 0_1. For instance, the BS 105 and/or the UE 115 may determine the HARQ process ID according to a certain formula or a certain rule associated with the CG. The COT sharing information transmitted in the second configuration signal and the activation signal may include one or more parameters associated with the FBE frame structure and/or the COT sharing timing, such as a duration of a second portion of the COT for sharing with the BS for a downlink communication signal, an energy detection (ED) threshold to be used for acquiring a COT for sharing with the BS, and/or an offset associated with the second portion of the COT. In some instances, the COT sharing information may be configured in a table format (e.g., by an RRC configuration and stored at a memory such as the memory 1204 of the UE 115), where each row of the table indicates a number of slots in which DL transmissions can be shared back in a UE COT, a DL offset indicating a starting slot of a DL transmission, which is indicated in the number of slots from a certain reference time or slot within the COT, and/or the channel access priority class (CAPC) of the traffic. As explained above, different ED thresholds may be used depending on what type of data (e.g., UE-specific, non-UE-specific) is being transmitted.

In general, the BS 105 may configure the UE 115 with the COT sharing information via any suitable signaling. For instance, the BS 105 may configure the UE 115 with COT sharing information fully within a CG configuration. In another instance, the BS 105 may the UE 115 with COT sharing information fully within a CG activation. In yet another instance, the BS 105 may the UE 115 with one or more COT sharing parameter(s) in a CG configuration and some other COT sharing parameter(s) in a CG activation. In a further instance, the BS 105 may the UE 115 with COT sharing information separate from another CG configuration and/or CG activation.

In action 540, the UE 115 performs an LBT procedure to contend for a COT according to the FBE frame structure indicated by the first configuration signal. For instance, the UE 115 may perform the LBT procedure during an idle period preceding an FFP where a CG resource is located as shown in FIG. 4. In some aspects, the LBT is a CAT2 LBT. If the LBT passes in action 540, the UE wins a COT 542 within the FFP.

In action 550, upon winning the COT 542, the UE 115 transmits an uplink communication signal to the BS 105, for example, in the CG resource at a beginning portion of the COT 542. The uplink communication signal may include a PUSCH communication, a sounding reference signal (SRS), or any other suitable uplink communication signal. In some aspects, the UE 115 may transmit a single uplink communication signal (e.g., a PUSCH signal) in the COT 542. In some aspects, the UE 115 may transmit two or more uplink communication signals in the COT 542.

In action 560, the BS 105 determines one or more aspects of the UE COT sharing, such as a beginning of a second portion, or shared portion, of the COT 542 in which the BS 105 can transmit a downlink communication signal. In some aspects, determining the aspect of the UE COT sharing comprises determining an offset of the UE COT sharing. As illustrated in FIG. 5, the offset is configured by the BS 105 and indicated to the UE 115 via an RRC signal and/or DCI. In some aspects, determining the aspect of the UE COT sharing comprises determining a duration of the shared portion. As illustrated in FIG. 5, the FBE structure and the CG resource is configured the by the BS 105 and indicated to the UE 115, and thus the duration of the FBE frame or FFP and the duration of the CG resource are known to the BS 105. Accordingly, the BS 105 can determine the duration of the shared portion by subtracting the FFP duration by the idle period, the CG duration, and the offset.

In action 570, the BS 105 transmits a downlink communication signal to the UE 115 during a shared portion of the UE COT 542. In some aspects, the BS 105 can transmit the downlink communication signal immediately following the completion of the uplink communication signal transmission by the UE 115. In some aspects, an offset is configured between the end of the first portion of the UE COT 542 in which the UE 115 transmits the uplink communication signal and the beginning of the second portion of the UE COT 542 in which the BS 105 transmits the downlink communication signal.

In some aspects, the COT sharing configuration illustrated in FIG. 5 may be used when retransmission in CG-UL resources is disabled and no CG-UCI is used in CG-PUSCH communications. Accordingly, the COT sharing information can be coded into downlink communication signals, such as RRC and/or DCI, which is then used by the BS 105 and UE 115 to share the COT.

Figure 6:
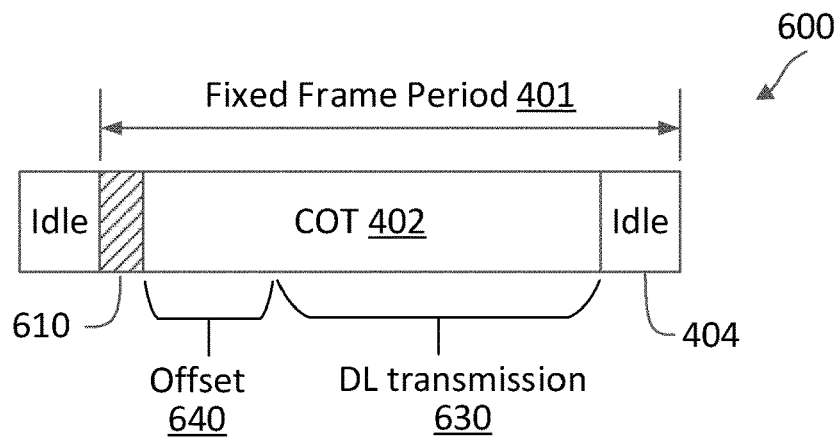
FIG. 6 is a timing diagram illustrating a COT sharing communication scenario according to some aspects of the present disclosure.
Figure 7:
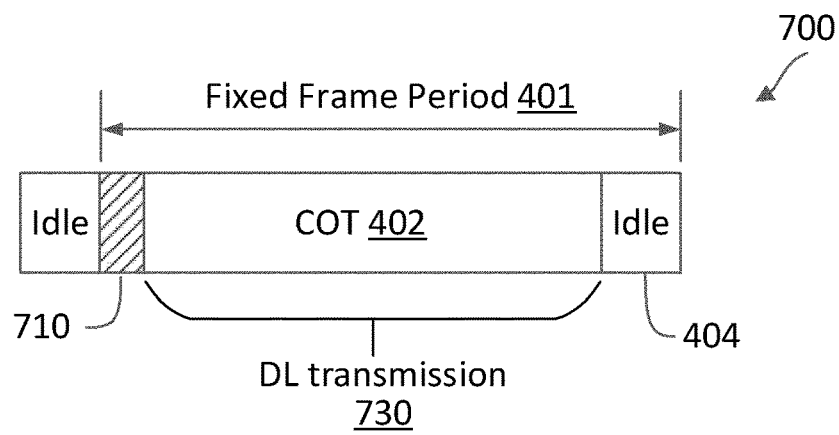
FIG. 7 is a timing diagram illustrating a COT sharing communication scenario according to some aspects of the present disclosure.
Figure 8:
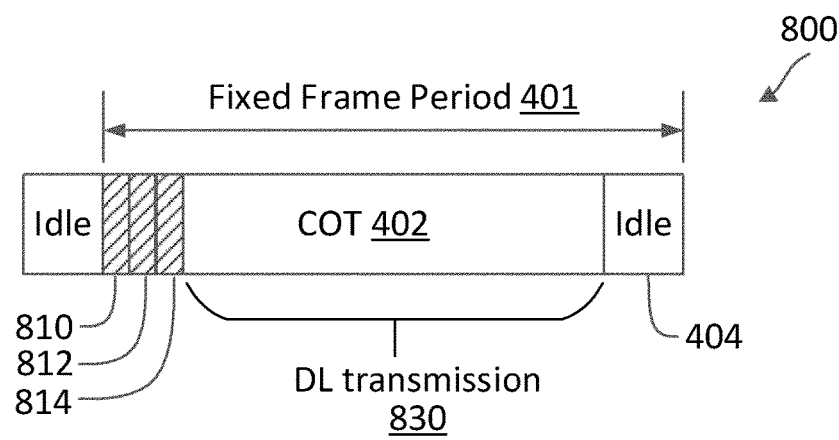
FIG. 8 is a timing diagram illustrating a COT sharing communication scenario according to some aspects of the present disclosure.

FIGS. 6, 7, and 8 are timing diagrams illustrating three respective COT sharing configurations 600, 700, and 800, respectively, during a fixed frame period (FFP) 401. The configurations 600, 700, and 800 may be employed by a UE such as the UE 115 to share a COT of the UE 115 with a BS such as the BS 105. The UE 115 and/or the BS 105 may utilize the configurations 600, 700, or 800 in conjunction with COT sharing mechanisms discussed above with respect to FIGS. 4 and/or 5. The FFP 401 includes a COT 402 and an idle period 404. The FFP 401 or COT 402 may be preceded by an idle period 404a of a preceding FFP 401. As explained above, an LBT procedure may be performed during the preceding idle period 404a to determine whether the COT 402 in the FFP 401 is available. If the LBT passes, the UE 115 transmits an uplink communication signal 610 during a first portion of the COT 402. In FIG. 6, the COT sharing configuration 600 includes an offset 640 between the uplink transmission 610 in a first portion of the COT 402 and a downlink transmission 630 for a subsequent second portion of the COT 402. The second portion of the COT 402 may occupy remaining duration of the COT 402 until the start of the idle period 404. The offset 640 may include any suitable value in any suitable units of time.

In some aspects, the FFP 401 shown in the FIG. 6 may correspond to an FFP at the UE 115, and the offset 604 is defined with respect to the UE 115's FFP timing. In some aspects, the BS 105 may be configured to utilize the same FFP structure as the UE 115. In other words, the BS 105 may also operate according to the FFP 401, for example, performing LBT in the idle period 404 and contending for a COT 402 in the FFP 401.

In some other aspects, the BS 105 and the UE 115 may be configured with different FFPs. For instance, the FFP at the BS 105 may have a different COT duration and/or an idle period duration than the COT 402 and/or the idle period 404, respectively. Additionally or alternatively, the FFPs of the BS 105 and the UE 115 may be misaligned in time with the FFPs of the UE 115 such that the FFP of the BS 105 begins and/or ends at some point during the UE COT 402 as will be discussed more fully below in FIG. 9. Accordingly, in some aspects, the offset 640 may be based on the BS FFP, such as the beginning of a BS COT (e.g., BS COT 902, FIG. 9). The offset may be configured by the BS 105, or by the UE 115. In some aspects, the offset 640 is configured by the BS 105 and indicated to the UE 115 in a downlink communication signal, such as an RRC and/or a DCI as shown in FIG. 5. In other aspects, the offset 640 is configured by the UE 115 and indicated to the BS 105 in an uplink communication signal of the uplink transmission 610, such as a CG-UCI as will be discussed more fully below in FIG. 10.

FIG. 7 shows another COT sharing configuration 700 in which a downlink transmission 730 starts at the end of an uplink transmission 710. In some aspects, the COT sharing configuration 700 shown in FIG. 7 is similar to the COT sharing configuration 600 shown in FIG. 6. For example, the COT sharing configuration 700 of FIG. 7 may be correspond to the configuration 600 with an offset of 0. In one aspect, the uplink transmission 710 may include a configured grant transmission, such as a CG-PUSCH signal including a CG-UCI. Similar to the configuration 600 shown in FIG. 6, the FFP 401 of the configuration 700 of FIG. 7 includes an idle period 404 following the COT 402.

FIG. 8 shows another COT sharing configuration 800 in which a downlink transmission 830 starts at the end of a series of uplink transmissions 810, 812, 814. The series of uplink transmissions 810, 812, 814 may be successive, or back-to-back, uplink transmissions or communications, and may be referred to as a burst of uplink transmissions. In some aspects, one or more of the uplink transmissions 810, 812, 814 may include a CG-PUSCH signal, an SRS, or any other suitable uplink communication signal. In some aspects, each of the uplink transmissions 810, 812, 814 may be transmitted in a different CG resource. For instance, the UE may be configured with 3 contiguous CG resources. In some other aspects, the uplink transmissions 810, 812, 814 may be transmitted with a single CG resource. Similar to the configuration 700 shown in FIG. 7, the downlink transmission 830 immediately follows the series of uplink transmissions 810, 812, 814, such that there is no offset, or an offset of zero, between the last uplink transmission 814 and the downlink transmission 830. Similar to the configurations 600 and 700 shown in FIGS. 6 and 7, the FFP 401 of the configuration 800 of FIG. 8 includes an idle period 404 following the COT 402.

Figure 9:
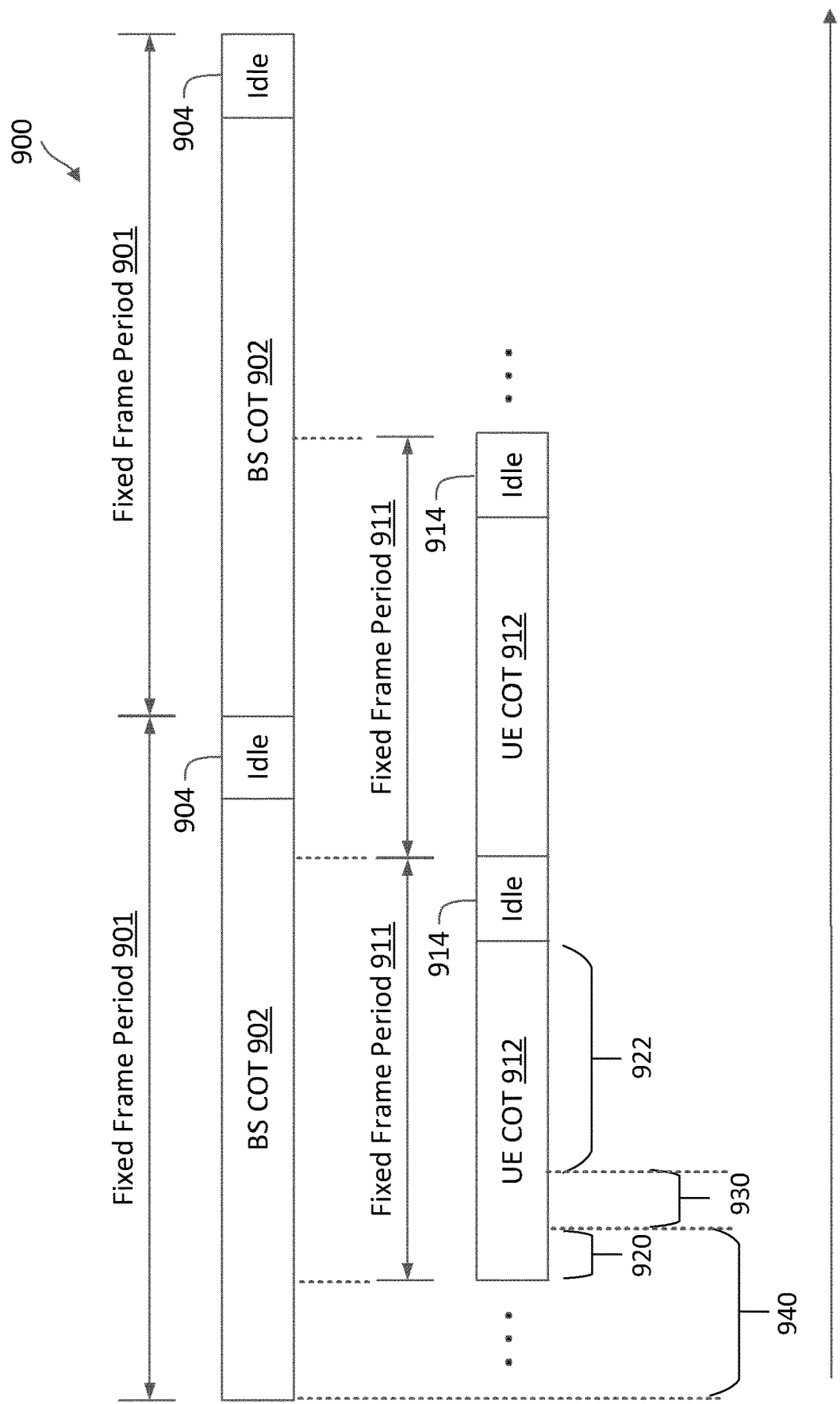
FIG. 9 is a timing diagram illustrating a frame structure of a first FBE frame of a BS and a frame structure of a second FBE frame of a UE according to aspects of the present disclosure.

FIG. 9 is a timing diagram illustrating different FFP structures of a BS, such as the BS 105 of FIG. 1, and a UE, such as the UE 115 of FIG. 1, in a CG-based communication scenario 900. In FIG. 9, the x-axis represents time in some arbitrary units. The FFPs 901, 911 each include a COT (BS COT 902, UE COT 912) and an idle period following each COT (904, 914). As shown in FIG. 9, the FFP 901 of the BS has a longer duration than the FFP 911 of the UE. Accordingly, the beginnings and endings of the FFP 901 for the BS are offset or misaligned from the FFP 911 for the UE. In some aspects, the misalignment of the FFPs 901, 911 may decrease the amount of time the BS and/or UE waits before a successful transmission. Accordingly, the chance of a successful transmission within a period of time is increased. For example, if the BS fails LBT at the beginning of the FFP 901 (e.g., during an idle period 904), the UE may attempt an LBT at the beginning of a UE FFP 911, which arrives sooner than the beginning of another BS FFP 901. As explained above, in some aspects, an offset (e.g., offset 640, FIG. 6) between a first portion 920 of a UE COT 912 and a second portion 922 of the UE COT 912 shared with the BS may be determined based on an offset 930 defined with respect to end of the first portion 920 of the UE COT 912. In some other aspects, an offset (e.g., offset 640, FIG. 6) between a first portion 920 of a UE COT 912 and a second portion 922 of the UE COT 912 shared with the BS may be determined based on an offset 940 defined with respect to a start of a BS FFP 901.

In some aspects, when the UE 115 and the BS 105 utilize the configurations 600, 700, or 800, the offset COT sharing can be configured with respect to the UE 115's FFP (e.g., FFP 911) or with respect to the BS 105's FFP (e.g., the FFP 901). Each of the UE 115 and the BS 105 may be aware of when a sharing portion of the UE's COT may start.

Figure 10:
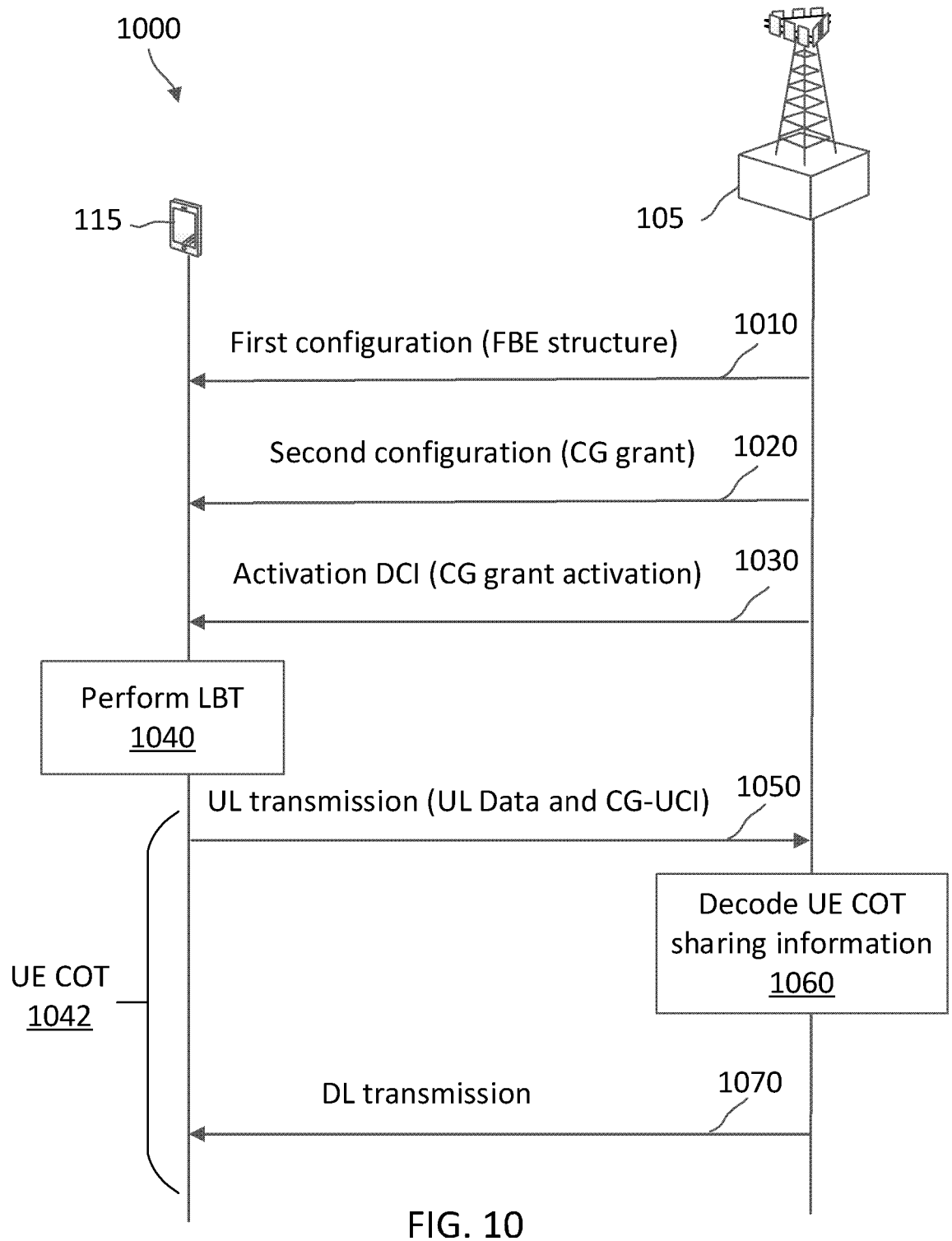
FIG. 10 is a flow diagram of a UE-initiated COT acquisition in a CG-based communication scenario according to some aspects of the present disclosure.

FIG. 10 is a sequence diagram of a COT sharing method 1000 between a BS 105 and a UE 115 in a CG-based communication scenario. The COT sharing method is performed using a semi-static FBE mode. For example, the BS 105 may utilize one or more components, such as the processor 1102, the memory 1104, the FBE-based UE COT sharing module 1108, the transceiver 1110, the modem 1112, and the one or more antennas 1116, to execute the steps or actions of the method 1000. Similarly, the UE 115 may utilize one or more components, such as the processor 1202, the memory 1204, the FBE-based UE COT sharing module 1208, the transceiver 1210, the modem 1212, and the one or more antennas 1216, to execute the steps of the method 1000. The method 1000 may be substantially similar to the method 500. However, in the method 1000, the UE 115 may determine COT sharing information and indicate the COT sharing information to the BS 105 instead of the BS 105 configuring the UE 115 with the COT sharing information. In action 1010, a first configuration signal indicating an FBE structure is transmitted from the BS 105 to the UE 115. The FBE structure may indicate a number of parameters of the FBE channel access configuration, such as a period or duration of the FBE frame (e.g., FFPs 401), the duration and/or location of an idle period within each FBE frame, time alignment of the FBE frames (e.g., with respect to a certain radio frame). In some aspects, the BS may transmit the first configuration signal in a system information block (SIB) message.

In action 1020, a second configuration signal is transmitted from the BS 105 to the UE 115. The second configuration signal may indicate a CG grant. The second configuration signal may be configured in RRC to include the CG grant. In some aspects, the second configuration signals may be performed similarly to the CG configuration 310 described with respect to FIG. 3. The COT sharing information may be configured in a table (e.g., pre-configured and pre-stored at a memory such as the memory 1204 of the UE 115), where each row of the table indicates a number of slots in which DL transmissions can be shared back in a UE COT, a DL offset indicating a starting slot of a DL transmission, which is indicated in the number of slots a certain reference time and/or the slot within the COT. As explained above, different ED thresholds may be used depending on what type of data (e.g., UE-specific, non-UE-specific) is being transmitted. In some aspects, a row of the table can include whether or not COT sharing will be used.

In action 1030, an activation signal is sent from the BS 105 to the UE 115. The activation signal indicates a CG grant activation. The activation signal may be included in DCI. In some aspects, the activation signal may be performed similarly to the CG activation 320 described with respect to FIG. 3.

In action 1040, the UE 115 performs an LBT procedure to contend for a COT according to the FBE frame structure indicated by the first configuration signal. For instance, the UE 115 may perform the LBT procedure during an idle period preceding an FFP where a CG resource is located as shown in FIG. 4. In some aspects, the LBT is a CAT2 LBT.

If the LBT passes in action 1040, the UE wins a COT 1042 within the FFP.

In action 1050, upon winning the COT 1042, the UE 115 transmits an uplink communication signal to the BS 105, for example, in the CG resource at a beginning portion of the COT 542. In the illustrated aspect, the uplink communication signal may be a CG-PUSCH signal carrying UL data multiplexed with CG-UCI. The CG-UCI may indicate COT sharing information that can be used by the BS 105 to carry out the sharing of the COT. For example, the COT sharing information may include one or more parameters associated with the COT sharing, such as a duration of a second portion of the COT allocated for a downlink communication signal, a COT sharing energy detection (ED) threshold, an offset of the COT, or a modulation and coding scheme (MCS). The uplink communication signal transmitted in action 1050 is transmitted during a first portion of the UE COT 1042. In some aspects, the UE may determine the number of resources (e.g., REs 210) that can be used for carrying the CG-UCI based on the same encoding parameter (e.g., a beta-offset parameter) used for encoding HARQ-ACK in a CG-PUSCH transmission. In some other aspects, the BS may configure the UE with a new beta-offset parameter for encoding CG-UCI with COT sharing information.

In some aspects, the BS 105 may configure the UE 115 with an MCS to be used for transmitting the uplink communication signal in the CG resource. However, channel conditions may vary over time. Thus, the MCS configured by the BS may not be an optimal MCS at the time when the UE 115 transmits the uplink communication signal. Accordingly, the UE may determine an MCS that is more suitable for the channel condition at the time when the uplink communication signal is transmitted. To that end, the UE may perform channel measurements (e.g., receive signal strength indicator (RSSI), signal-to-noise ratio (SNR), and/or signal-to-interference-plus-noise ratio (SINR)) and/or channel state information (CSI) from downlink communication signal (e.g., a reference signal) received from the BS 105. The UE may determine the MCS based on the channel measurements and assuming UL-to-DL channel reciprocity. Updating MCS to adapt to channel conditions can improve uplink transmission performance (e.g., with a lower bit-error-ratio (BER) and/or packet-error rate (PER)).

In action 1060, the BS 105 decodes the COT sharing information (e.g., from CG-UCI) in the uplink transmission to determine one or more aspects of the UE COT sharing, such as a beginning of a second portion, or shared portion, of the COT in which the BS 105 can transmit a downlink communication signal. In some instances, the BS 105 may be aware of the multiplexing configuration used by the UE 115 to multiplex CG-UCI and the UL data, and thus the BS 105 may decode and/or recover the CG-UCI from the uplink communication signal based on the multiplexing configuration (e.g., locations of resources where the CG-UCI is carried or bit positions of CG-UCI within the uplink communication signal. In some aspects, determining the aspect of the UE COT sharing comprises determining an offset of the UE COT sharing and/or a duration of the sharing portion.

In action 1070, the BS 105 transmits a downlink communication signal to the UE 115 during a shared portion of the UE COT 542. In some aspects, the BS 105 can transmit the downlink communication signal immediately following the completion of the uplink communication signal transmission by the UE 115. In some aspects, an offset is configured between the end of the first portion of the UE COT 542 in which the UE 115 transmits the uplink communication signal and the beginning of the second portion of the UE COT 542 in which the BS 105 transmits the downlink communication signal.

In some aspects, the COT sharing configuration illustrated in FIG. 10 may be used when retransmission in CG-UL resources is disabled and CG-UCI is used in CG-PUSCH communications. In this regard, the BS 105 may not provide the UE with any HARQ feedback for a CG transmission, and the UE 115 may not initiate a retransmission of a CG transmission. Instead, the BS 105 may schedule the UE 115 for a retransmission when the BS 105 fails to receive a CG transmission from the UE 115 successfully. Accordingly, the UE 115 may also disable any time related to CG retransmissions. In some aspects, the content of the CG-UCI may be different from typical CG-UCI communications. For example, in some aspects, the CG-UCI may include only COT sharing information, and exclude other information such as HARQ ID, RVID, and/or NDI. Alternatively, the CG-UCI can include COT sharing information and other HARQ related parameters (e.g., HARQ ID, RVID, and/or NDI) to provide flexibility.

In some other aspects, COT sharing can be supported in conjunction with CG retransmissions. In this regard, the BS 105 may provide the UE 115 with HARQ feedback or downlink feedback information (DFI), and the UE 115 may initiate a retransmission upon receiving a negative-acknowledgement (NACK) from the BS 105 or a failing to receive an acknowledgement (ACK) from the BS 105 for a CG transmission. Accordingly, the CG-UCI can include HARQ ID, RVID, and/or NDI associated with a CG transmission (an uplink communication signal) in the UE COT 1042.

Although FIG. 5 as discussed above illustrates a BS configuring a UE with COT sharing information and FIG. 10 as discussed above illustrates a UE determining COT sharing information and indicating the COT sharing information to the BS via CG-UCI, it should be understood that in other examples, the BS and/or the UE may be configured with one or more predetermined parameters for COT sharing. In general, COT sharing information can be configured by the BS, determined by the UE, and/or preconfigured based on predetermined values specified by a particular wireless communication protocol or standard, such as 3GPP.

Figure 11:
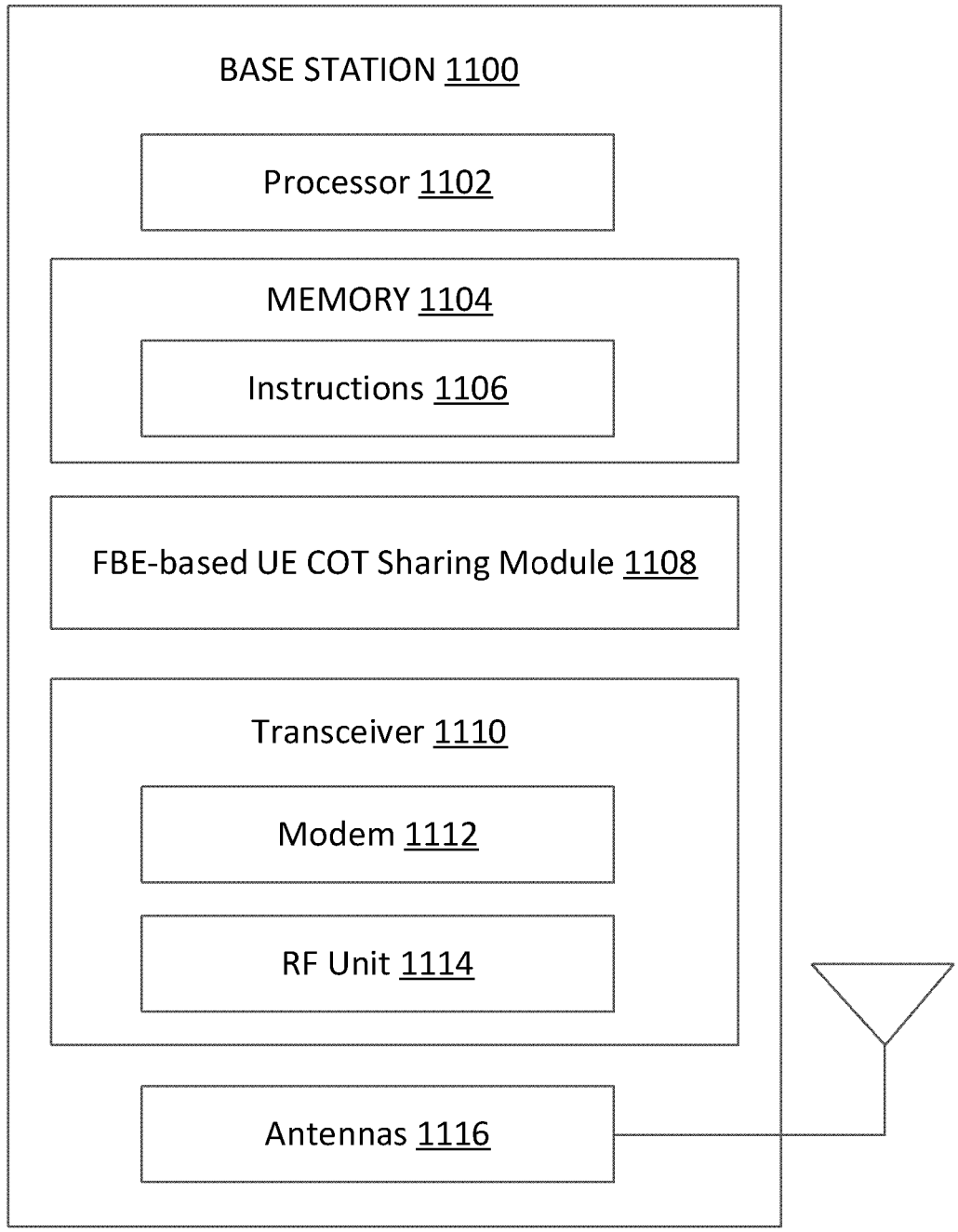
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIG. 1. As shown, the BS 1100 may include a processor 1102, a memory 1104, an FBE-based UE COT sharing module 1108, a transceiver 1110 including a modem subsystem 1112 and an RF unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1-10 and 14. Instructions 1106 may also be referred to as code, which may be interpreted broadly to include any type of computer-readable statement(s) as discussed above.

The FBE-based UE COT sharing module 1108 may be implemented via hardware, software, or combinations thereof. For example, the FBE-based UE COT sharing module 1108 may be implemented as a processor, circuit, and/or instructions 1106 stored in the memory 1104 and executed by the processor 1102. In some instances, the FBE-based UE COT sharing module 1108 can be integrated within the modem subsystem 1112. For example, the FBE-based UE COT sharing module 1108 can be implemented by a combination of software components (e.g., executed by a DSP or a general processor) and hardware components (e.g., logic gates and circuitry) within the modem subsystem 1112.

The FBE-based UE COT sharing module 1108 may communicate with various components of the BS 1100 to perform various aspects of the present disclosure, for example, aspects of FIGS. 1-10 and 14. For instance, the FBE-based UE COT sharing module 1108 may be configured to receive, from a user equipment (UE), an uplink communication signal during a first portion of a COT, where the COT is associated with the UE and is within a first frame-based equipment (FBE) frame (e.g., FFPs 401 of FIG. 4). The FBE-based UE COT sharing module 1108 may be further configured to transmit, to the UE based on COT sharing information, a downlink communication signal during a second portion of the COT, where the second portion is non-overlapping with the first portion. In some aspects, the COT sharing information includes at least one of a first ED threshold, a duration associated with the second portion, or an offset associated with the second portion. In some aspects, the COT sharing information comprises the offset, and the FBE-based UE COT sharing module 1108 is further configured to determine the second portion of the COT based on the offset. In some aspects, the offset is based on a second FBE frame of the BS different from the first FBE frame of the UE. In some aspects, the offset is based on the first FBE frame of the UE different from a second FBE frame of the BS.

In some aspects, the first FBE frame of the UE is time-offset from the second FBE frame of the BS. In some aspects, the offset is relative to the end of the uplink communication signal as discussed above with respect to FIG. 6. In some aspects, the offset is 0 as discussed above with respect to FIG. 7. In some aspects, receiving the uplink communication signal comprises receiving a plurality of uplink communication signals, wherein the offset is relative to a last uplink communication signal of the plurality of uplink communication signals as discussed above with respect to FIG. 8.

In some aspects, the COT sharing information comprises the duration associated with the second portion, and the FBE-based UE COT sharing module 1108 is further configured to determine the duration of the second portion based on at least one of a duration of the first FBE frame or a duration of the uplink communication signal. In some aspects, the FBE-based UE COT sharing module 1108 is further configured to transmit, to the UE, a configuration for the first FBE frame. In some aspects, the FBE-based UE COT sharing module 1108 is further configured to transmit, to the UE, the COT sharing information as discussed above with respect to FIG. 5. In some aspects, the FBE-based UE COT sharing module 1108 is configured to transmit, to the UE, a radio resource control (RRC) configuration indicating the COT sharing information. In some aspects, the RRC configuration indicates a configured grant, and the FBE-based UE COT sharing module 1108 is configured to receive the uplink communication signal based on the configured grant. In some aspects, the FBE-based UE COT sharing module 1108 is configured to transmit, to the UE, downlink control information (DCI) indicating the COT sharing information. In some aspects, the DCI indicates an activation for a configured grant, and the FBE-based UE COT sharing module 1108 is configured to receive the uplink communication signal including the COT sharing information.

In some aspects, the FBE-based UE COT sharing module 1108 is configured to receive, based on a configured grant, a configured grant physical uplink shared channel (CG-PUSCH) signal, the CG-PUSCH signal including configured grant uplink control information (CG-UCI), and the CG-UCI including the COT sharing information indicating at least one of a COT sharing energy detection (ED) threshold, an offset of the COT, a hybrid automatic repeat request (HARM) process ID, a redundancy version identifier (RVID), a new data indicator (NDI), or a modulation and coding scheme (MCS) as discussed above with respect to FIG. 10. In some aspects, the FBE-based UE COT sharing module 1108 is further configured to disable a retransmission timer associated with the uplink communication signal. In some aspects, the downlink communication signal comprises a broadcast communication. In some aspects, the downlink communication signal comprises a UE-specific communication.

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a polar coding scheme, a digital beamforming scheme, etc. The RF unit 1114 may be configured to process (e.g., perform analog to digital conversion or digital to analog conversion, etc.) modulated/encoded data (e.g., PDCCH, PDSCH, configured grants, dynamic scheduling grants, RRC configuration, CG configuration, CG activation, LBT configuration, COT sharing information, DL eMBB data, DL URLLC data) from the modem subsystem 1112 (on outbound transmissions) or of transmissions originating from another source such as a UE 115. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. This may include, for example, transmission of information to complete attachment to a network and communication with a camped UE 115 according to some aspects of the present disclosure. The antennas 1116 may further receive data messages transmitted from other devices and provide the received data messages for processing and/or demodulation at the transceiver 1110. The transceiver 1110 may provide the demodulated and decoded data (e.g., PUCCH, PUSCH, COT sharing information, CG-UCI, CG-PUSCH, CG-UL data, eMBB data, URLLC data) to the FBE-based UE COT sharing module 1108 for processing. The antennas 1116 may include multiple antennas of similar or different designs in order to sustain multiple transmission links.

In some aspects, the processor 1102 is configured to communicate with components of the BS 1100 to receive, from a user equipment (UE), an uplink communication signal during a first portion of a COT, where the COT is associated with the UE and is within a first frame-based equipment (FBE) frame. The transceiver 1110 is configured to communicate with components of the BS 1100 to and transmit, to the UE based on COT sharing information, a downlink communication signal during a second portion of the COT, where the second portion is non-overlapping with the first portion.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
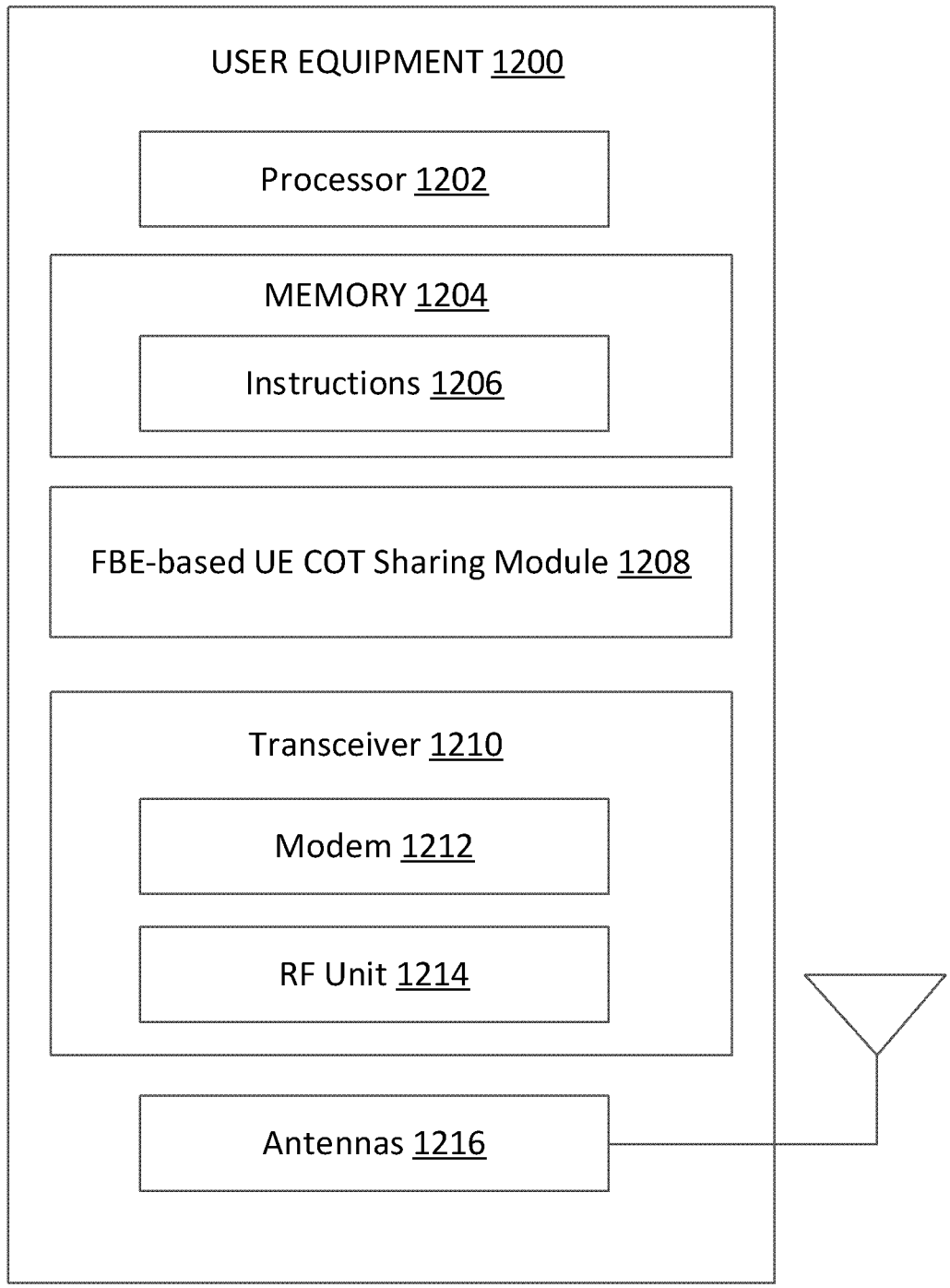
FIG. 12 is a block diagram of an exemplary user equipment (UE) according to some aspects of the present disclosure.

FIG. 12 is a block diagram of an exemplary UE 1200 according to some aspects of the present disclosure. The UE 1200 may be a UE 115 discussed above in FIG. 1. As shown, the UE 1200 may include a processor 1202, a memory 1204, an FBE-based UE COT sharing module 1208, a transceiver 1210 including a modem subsystem 1212 and a radio frequency (RF) unit 1214, and one or more antennas 1216. These elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UEs 115 in connection with aspects of the present disclosure, for example, aspects of FIGS. 1-10 and 13. Instructions 1206 may also be referred to as program code. The program code may be for causing a wireless communication device to perform these operations, for example by causing one or more processors (such as processor 1202) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The FBE-based UE COT sharing module 1208 may be implemented via hardware, software, or combinations thereof. For example, the FBE-based UE COT sharing module 1208 may be implemented as a processor, circuit, and/or instructions 1206 stored in the memory 1204 and executed by the processor 1202. In some instances, the FBE-based UE COT sharing module 1208 can be integrated within the modem subsystem 1212. For example, the FBE-based UE COT sharing module 1208 can be implemented by a combination of software components (e.g., executed by a DSP or a general processor) and hardware components (e.g., logic gates and circuitry) within the modem subsystem 1212.

The FBE-based UE COT sharing module 1208 may communicate with various components of the UE 1200 to perform various aspects of the present disclosure, for example, aspects of FIGS. 1-10 and 13. For instance, the FBE-based UE COT sharing module 1208 may be configured to contend for a COT in a first FBE frame (e.g., FFPs 401 of FIG. 4), transmit, to a BS, an uplink communication signal during a first portion of the COT. and receive, from the BS based on COT sharing information, a downlink communication signal during a second portion of a COT, where the second portion is non-overlapping with the first portion.

The COT sharing information may include at least one of a first ED threshold, a duration associated with the second portion, or an offset associated with the second portion. In some aspects, the COT sharing information comprises the first ED threshold, and the FBE-based UE COT sharing module 1208 is further configured to select between the first ED threshold or a second ED threshold different from the first ED threshold. In some aspects, the COT sharing information includes the offset, and the FBE-based UE COT sharing module 1208 is further configured to determine the second portion of the COT based on the offset. In some aspects, the offset is based on a second FBE frame of the BS different from the first FBE frame of the UE. In some aspects, the offset is based on the first FBE frame of the UE different from a second FBE frame of the BS. In some aspects, the first FBE frame of the UE is time-offset from the second FBE frame of the BS. In some aspects, the offset is relative to the end of the uplink communication signal as discussed above with respect to FIG. 6. In some aspects, the offset is 0 as discussed above with respect to FIG. 7. In some aspects, the FBE-based UE COT sharing module 1208 is configured to receive a plurality of uplink communication signals, wherein the offset is relative to a last uplink communication signal of the plurality of uplink communication signals as discussed above with respect to FIG. 8.

In some aspects, the FBE-based UE COT sharing module 1208 is configured to receive, from the BS, a configuration for the first FBE frame. In some aspects, the FBE-based UE COT sharing module 1208 is further configured to receive, from the BS, the COT sharing formation as discussed above with respect to FIG. 10. In some aspects, the FBE-based UE COT sharing module 1208 is further configured to receive, from the BS, a radio resource control (RRC) configuration indicating the COT sharing information. In some aspects, the RRC configuration indicates a configured grant, and the FBE-based UE COT sharing module 1208 is configured to transmit the uplink communication signal based on the configured grant. In some aspects, the FBE-based UE COT sharing module 1208 is configured to receive, from the BS, downlink control information (DCI) indicating the COT sharing information. In some aspects, the DCI indicates an activation for a configured grant, and the FBE-based UE COT sharing module 1208 is configured to transmit the uplink communication signal including the COT sharing information.

In some aspects, the FBE-based UE COT sharing module 1208 is configured to transmit, based on a configured grant, a configured grant physical uplink shared channel (CG-PUSCH) signal, the CG-PUSCH signal including configured grant uplink control information (CG-UCI), and the CG-UCI including the COT sharing information indicating at least one of a COT sharing energy detection (ED) threshold, an offset of the COT, a hybrid automatic repeat request (HARQ) process ID, a redundancy version identifier (RVID), a new data indicator (NDI), or a modulation and coding scheme (MCS) as discussed above with respect to FIG. 10. In some aspects, the COT sharing information includes the MCS, and the FBE-based UE COT sharing module 1208 is further configured to determine the MCS based on a channel measurement, which may be indicated in a channel state information (CSI). In some aspects, the FBE-based UE COT sharing module 1208 is further configured to disable a retransmission timer associated with the uplink communication signal. In some aspects, the downlink communication signal comprises a broadcast communication. In some aspects, the downlink communication signal comprises a UE-specific communication.

As shown, the transceiver 1210 may include the modem subsystem 1212 and the RF unit 1214. The transceiver 1210 can be configured to communicate bi-directionally with other devices, such as the BSs 105. The modem subsystem 1212 may be configured to modulate and/or encode the data from the memory 1204 and/or the FBE-based UE COT sharing module 1208 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 1214 may be configured to process (e.g., perform analog to digital conversion or digital to analog conversion, etc.) modulated/encoded data (e.g., PUCCH, PUSCH, COT sharing information, CG-UCI, CG-PUSCH, CG-UL data, UL eMBB data, UL URLLC data) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may contain one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., PDCCH, PDSCH, configured grants, dynamic scheduling grants, RRC configuration, CG configuration, CG activation, LBT configuration, COT sharing information, DL eMBB data, DL URLLC data) to the FBE-based UE COT sharing module 1208 for processing. The antennas 1216 may include multiple antennas of similar or different designs in order to sustain multiple transmission links. The RF unit 1214 may configure the antennas 1216.

In some aspects, the processor 1202 is configured to communicate with components of the UE 1200 to contend for a COT in a first FBE frame. The transceiver 1210 configured to communicate with components of the UE 1200 to transmit, to a BS, an uplink communication signal during a first portion of the COT and receive, from the BS based on COT sharing information, a downlink communication signal during a second portion of a COT, where the second portion is non-overlapping with the first portion.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
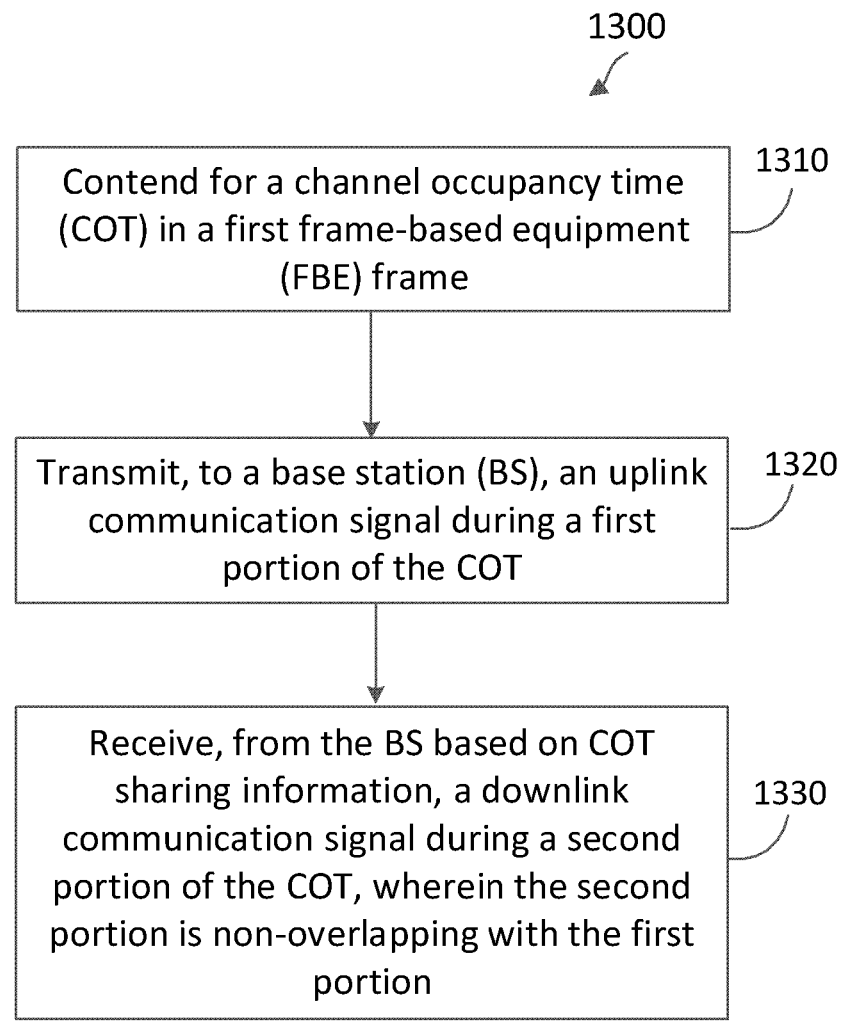
FIG. 13 is a flow diagram of a communication method according to some aspects of the present disclosure.

FIG. 13 is a flow diagram of a communication method 1300 according to some aspects of the present disclosure. Aspects of the method 1300 can be executed by a UE, such as the UEs 115 and/or 1200. A UE may comprise a processor, processing circuit, and/or any other suitable component or means for performing the steps. For example, a UE 1200 may utilize one or more components, such as the processor 1202, the memory 1204, the FBE-based UE COT sharing module 1208, the transceiver 1210, the modem 1212, and the one or more antennas 1216, to execute the steps of method 1300. The method 1300 may employ similar mechanisms as in the schemes 300, 400, 500, 600, 700, 800, and 900 discussed above with respect to FIGS. 3-9. The method 1300 may be employed as part of a configured grant (CG) semi-static channel access scheme using frame-based equipment (FBE). For example, the method 1300 may be employed in NR-U in an IIOT scenario. Further, the method 1300 may be used to enable URLLC between a BS and a UE. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, the UE contends for a channel occupancy time (COT) in a first frame-based equipment (FBE) frame (e.g., the FFPs 410, 911). Contending for the COT may include performing an LBT, such as a CAT2 LBT. Performing the LBT may include performing one or more clear channel assessments (CCAs) to measure or detect signal energy during one or more periods, such as a deferral period and a countdown period. In some aspects, the UE may utilize one or more components, such as the processor 1202, the memory 1204, the FBE-based UE COT sharing module 1208, the transceiver 1210, the modem 1212, and the one or more antennas 1216, to perform the operations of block 1310.

If the LBT passes, the UE transmits, to a BS, an uplink communication signal during a first portion of the acquired COT in block 1320. The uplink communication signal may include any suitable uplink communication, such as a CG-PUSCH communication including a CG-UCI. In some aspects, the uplink communication signal includes COT sharing information, such as a COT sharing energy detection (ED) threshold, an offset of the COT, a hybrid automatic repeat request (HARQ) process ID, a redundancy version identifier (RVID), a new data indicator (NDI), or a modulation and coding scheme (MCS). In some other aspects, the uplink communication signal may not include COT sharing information. Instead, the COT sharing information may be configured by the BS via RRC signaling and/or DCI signaling. In some aspects, transmitting the uplink communication signal comprises transmitting a plurality of uplink communication signals. For example, the UE may transmit a plurality of successive uplink communication signals. In some aspects, the uplink communication signal(s) may comprise one or more CG-PUSCH communications including CG-UCI, one or more SRSs, or any other suitable uplink communication. In some aspects, the COT sharing information comprises MCS, and the method further comprises determining the MCS based on a channel measurement, for example, as discussed above in relation to FIG. 10. In some aspects, the UE may utilize one or more components, such as the processor 1202, the memory 1204, the FBE-based UE COT sharing module 1208, the transceiver 1210, the modem 1212, and the one or more antennas 1216, to perform the operations of block 1320.

At block 1330, the UE receives, from the BS based on COT sharing information, a downlink communication signal during a second portion of the COT, wherein the second portion is non-overlapping with the first portion. As explained above with respect to FIGS. 6-9, the second portion of the COT may begin immediately after the uplink communication signal is transmitted by the UE, or may begin after some offset period following the transmission of the uplink communication signal. In some aspects, the UE or the BS determines the second portion of the COT based on an offset indicated in the COT sharing information. The offset may be determined, for example, based on a second FBE frame of the BS, which is different from the first FBE frame of the UE. For example, a duration or periodicity of the second FBE frame may be different from the first FBE frame. In some aspects, the first FBE frame of the UE may be time-offset from the second FBE frame of the BS. For example, in some aspects, the second FBE frame of the BS may begin during a COT of the first FBE frame. In some aspects, the offset is determined based on the first FBE frame of the UE, which is different from the second FBE frame of the BS. In some aspects, the offset is relative to the end of the uplink communication signal. In some aspects, the offset is 0. The COT sharing information may include or indicate a first ED threshold, a duration associated with the second portion of the COT, or an offset associated with the second portion. In some aspects, the UE makes a selection between the first ED threshold or a second ED threshold. For example, a first ED threshold based on the UE's maximum transmit power may be used, and the BS can share a COT for non-UE specific data, and control transmission in the shared COT. A second ED threshold based on the BS's maximum transmit power may be used, and the BS can share the COT for UE-specific data. If the second ED threshold is configured, the UE may be mandated or configured to use the second ED threshold to initiate COT. In some aspects, the downlink communication signal includes a broadcast communication, such as a GC-PDCCH. In some aspects, the downlink communication signal includes a UE-specific communication, such as a PDSCH to the UE that initiated the COT. The downlink communication signal may include a PDSCH communication including a DCI, a DM-RS, or any other suitable downlink communication. In some aspects, the UE may utilize one or more components, such as the processor 1202, the memory 1204, the FBE-based UE COT sharing module 1208, the transceiver 1210, the modem 1212, and the one or more antennas 1216, to perform the operations of block 1330.

In some aspects, the method 1300 further comprises receiving, from the BS, a configuration for the first FBE frame. In some aspects, the method 1300 further comprises receiving, from the BS, the COT sharing information. In some aspects, receiving the COT sharing information comprises receiving, from the BS, an RRC configuration indicating the COT sharing information. In some aspects, the RRC configuration indicates a configured grant, and transmitting the uplink communication signal is further based on the configured grant. In some aspects, receiving the COT sharing information comprises receiving, from the BS, downlink control information (DCI) indicating the COT sharing information. In some aspects, the DCI further indicates an activation for a configured grant, and transmitting the uplink communication signal at block 1310 is further based on the configured grant. In some aspects, the method further comprises disabling a retransmission timer associated with the uplink communication signal. For example, the UE may disable a CG-retransmission timer. In some aspects, in the CG communication scheme, HARQ ID, RVID, and NDI are not indicated by CG-UCI. In some aspects, in the CG communication scheme, (DFI) is not transmitted.

Figure 14:
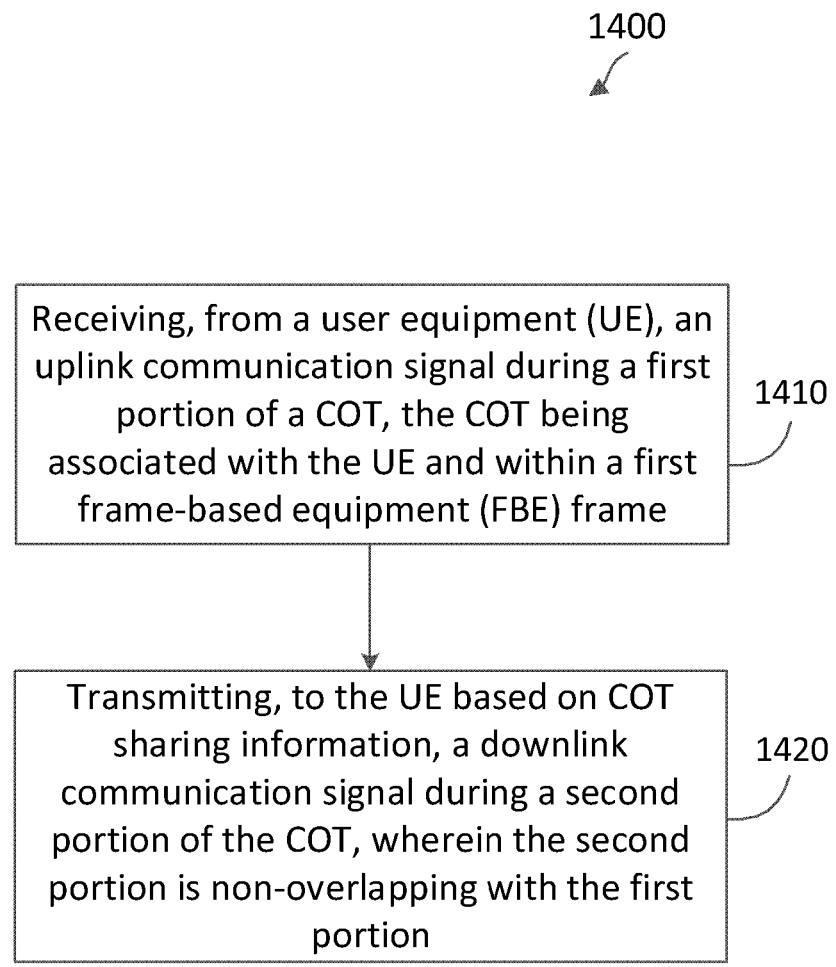
FIG. 14 is a flow diagram of a communication method according to some aspects of the present disclosure.

FIG. 14 is a flow diagram of a communication method 1400 according to some aspects of the present disclosure. Aspects of the method 1400 can be executed by a BS, such as the BSs 105 and/or 1100. A BS may comprise a processor, processing circuit, and/or any other suitable component or means for performing the steps. For example, a BS 1100 may utilize one or more components, such as the processor 1102, the memory 1104, the FBE-based UE COT sharing module 1108, the transceiver 1110, the modem 1112, and the one or more antennas 1116, to execute the steps of method 1400. The method 1400 may employ similar mechanisms as in the schemes 300, 400, 500, 600, 700, 800, and 900 discussed above with respect to FIGS. 3-9. The method 1400 may be employed as part of a configured grant (CG) semi-static channel access scheme using frame-based equipment (FBE). For example, the method 1400 may be employed in NR-U in an HOT scenario. Further, the method 1400 may be used to enable URLLC between a BS and a UE. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, the BS receives, from a UE, an uplink communication signal during a first portion of a COT, where the COT is associated with the UE and within a first frame-based equipment (FBE) frame (e.g., the FFPs 410, 901). As described above with respect to block 1310 of the method 1300, the COT may be acquired by UE following a successful LBT procedure. In some aspects, the uplink communication signal includes COT sharing information, such as a COT sharing energy detection (ED) threshold, an offset of the COT, a hybrid automatic repeat request (HARQ) process ID, a redundancy version identifier (RVID), a new data indicator (NDI), or a modulation and coding scheme (MCS). The COT sharing information may be configured as RRC parameters. In some aspects, receiving the uplink communication signal comprises receiving a plurality of uplink communication signals. For example, the BS may receive a plurality of successive uplink communication signals, referred to as a burst of uplink communication signals. In some aspects, the uplink communication signal(s) may comprise one or more CG-PUSCH communications including CG-UCI, one or more SRSs, or any other suitable uplink communication. In some aspects, the COT sharing information comprises MCS, and the method further comprises determining the MCS based on a channel measurement, for example, as discussed above in relation to FIG. 10. In some aspects, the BS may utilize one or more components, such as the processor 1102, the memory 1104, the FBE-based UE COT sharing module 1108, the transceiver 1110, the modem 1112, and the one or more antennas 1116, to perform the operations of block 1410.

At block 1420, the BS transmits, to the UE based on COT sharing information, a downlink communication signal during a second portion of the COT, wherein the second portion is non-overlapping with the first portion. As explained above with respect to FIGS. 6-9, the second portion of the COT may begin immediately after the uplink communication signal is transmitted by the UE, or may begin after some offset period following the transmission of the uplink communication signal. In some aspects, the UE or the BS determines the second portion of the COT based on an offset indicated in the COT sharing information. The offset may be determined, for example, based on a second FBE frame of the BS, which is different from the first FBE frame of the UE. For example, a duration or periodicity of the second FBE frame may be different from the first FBE frame. In some aspects, the first FBE frame of the UE may be time-offset from the second FBE frame of the BS. For example, in some aspects, the second FBE frame of the BS may begin during a COT of the first FBE frame. In some aspects, the offset is determined based on the first FBE frame of the UE, which is different from the second FBE frame of the BS. In some aspects, the offset is relative to the end of the uplink communication signal. In some aspects, the offset is 0. The COT sharing information may include or indicate a first ED threshold, a duration associated with the second portion of the COT, or an offset associated with the second portion. In some aspects, the downlink communication signal includes a broadcast communication, such as a GC-PDCCH. In some aspects, the downlink communication signal includes a UE-specific communication, such as a PDSCH to the UE that initiated the COT. The downlink communication signal may include a PDSCH communication including a DCI, a DM-RS, or any other suitable downlink communication. In some aspects, the BS may utilize one or more components, such as the processor 1102, the memory 1104, the FBE-based UE COT sharing module 1108, the transceiver 1110, the modem 1112, and the one or more antennas 1116, to perform the operations of block 1420.

In some aspects, the method 1400 further comprises transmitting, to the UE, a configuration for the first FBE frame. In some aspects, the method 1400 further comprises transmitting, to the UE, the COT sharing information. In some aspects, transmitting the COT sharing information comprises transmitting, to the UE, an RRC configuration indicating the COT sharing information. In some aspects, the RRC configuration indicates a configured grant, and transmitting the uplink communication signal is further based on the configured grant. In some aspects, transmitting the COT sharing information comprises transmitting, to the UE, downlink control information (DCI) indicating the COT sharing information. In some aspects, the DCI further indicates an activation for a configured grant, and receiving the uplink communication signal is further based on the configured grant. In some aspects, the method further comprises disabling a retransmission timer associated with the uplink communication signal. In some aspects, in the CG communication scheme, HARQ ID, RVID, and NDI are not indicated by CG-UCI. In some aspects, in the CG communication scheme, (DFI) is not transmitted.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). The terms "about" or "approximately" may be used to denote a range of +/−2%, unless specified otherwise.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   contending for a channel occupancy time (COT) in a first frame-based equipment (FBE) frame;
   transmitting, to a base station (BS), an uplink communication signal during a first portion of the COT; and
   receiving, from the BS based on COT sharing information, a downlink communication signal during a second portion of the COT, wherein the second portion is non-overlapping with the first portion, wherein the COT sharing information is indicated by a hybrid automatic repeat request (HARQ) process identifier (ID) field of downlink control information (DCI).

2. The method of claim 1, wherein the COT sharing information comprises at least one of a first energy detection (ED) threshold, a duration associated with the second portion, or an offset associated with the second portion.

3. The method of claim 2, wherein the COT sharing information comprises the first ED threshold, and wherein the method further comprises selecting between the first ED threshold or a second ED threshold different from the first ED threshold.

4. The method of claim 2, wherein the COT sharing information comprises the offset, and wherein the method further comprises determining the second portion of the COT based on the offset.

5. The method of claim 4, wherein the offset is based on a second FBE frame of the BS different from the first FBE frame of the UE.

6. The method of claim 4, wherein the offset is based on the first FBE frame of the UE different from a second FBE frame of the BS.

7. The method of claim 1, further comprising receiving, from the BS, a configuration for the first FBE frame.

8. The method of claim 1, further comprising receiving, from the BS,
the DCI.

9. The method of claim 1, wherein the transmitting the uplink communication signal comprises:
transmitting the uplink communication signal including the COT sharing information; and
transmitting, based on a configured grant, a configured grant physical uplink shared channel (CG-PUSCH) communication signal, the CG-PUSCH communication signal including configured grant-uplink control information (CG-UCI), the COT sharing information indicating at least one of a COT sharing energy detection (ED) threshold, an offset of the COT, a HARQ process ID, a redundancy version identifier (RVID), a new data indicator (NDI), or a modulation and coding scheme (MCS).

10. A method of wireless communication performed by a base station (BS), the method comprising:
receiving, from a user equipment (UE), an uplink communication signal during a first portion of a COT, the COT being associated with the UE and within a first frame-based equipment (FBE) frame; and
transmitting, to the UE based on COT sharing information, a downlink communication signal during a second portion of the COT, wherein the second portion is non-overlapping with the first portion, wherein the COT sharing information is indicated by a hybrid automatic repeat request (HARQ) process identifier (ID) field of downlink control information (DCI).

11. The method of claim 10, wherein the COT sharing information comprises at least one of a first energy detection (ED) threshold, a duration associated with the second portion, or an offset associated with the second portion.

12. The method of claim 11, wherein the COT sharing information comprises the offset, and wherein the method further comprises determining the second portion of the COT based on the offset.

13. The method of claim 12, wherein the offset is based on a second FBE frame of the BS different from the first FBE frame of the UE.

14. The method of claim 12, wherein the offset is based on the first FBE frame of the UE different from a second FBE frame of the BS.

15. The method of claim 11, wherein the COT sharing information comprises the duration associated with the second portion, and wherein the method further comprises:
determining the duration for the second portion based on at least one of a duration of the first FBE frame or a duration of the uplink communication signal.

16. The method of claim 10, further comprising transmitting, to the UE,
the DCI.

17. The method of claim 10, wherein the receiving the uplink communication signal comprises:
receiving the uplink communication signal including the COT sharing information; and
receiving, based on a configured grant, a configured grant physical uplink shared channel (CG-PUSCH) communication signal, the CG-PUSCH communication signal including configured grant-uplink control information (CG-UCI), and the COT sharing information indicating at least one of a COT sharing energy detection (ED) threshold, an offset of the COT, a HARQ process ID, a redundancy version identifier (RVID), a new data indicator (NDI), or a modulation and coding scheme (MCS).

18. A user equipment (UE) comprising: a processor configured to:
contend for a channel occupancy time (COT) in a first frame-based equipment (FBE) frame;
a transceiver configured to:
transmit, to a base station (BS), an uplink communication signal during a first portion of the COT; and
receive, from the BS based on COT sharing information, a downlink communication signal during a second portion of the COT, wherein the second portion is non-overlapping with the first portion, wherein the COT sharing information is indicated by a hybrid automatic repeat request (HARQ) process identifier (ID) field of downlink control information (DCI).

19. A user equipment (UE) comprising:
means for contending for a channel occupancy time (COT) in a first frame-based equipment (FBE) frame;
means for transmitting, to a base station (BS), an uplink communication signal during a first portion of the COT; and
means for receiving, from the BS based on COT sharing information, a downlink communication signal during a second portion of the COT, wherein the second portion is non-overlapping with the first portion, and wherein the COT sharing information is indicated by a hybrid automatic repeat request (HARQ) process identifier (ID) field of downlink control information (DCI).

20. The UE of claim 19, wherein the COT sharing information comprises at least one of a first energy detection (ED) threshold, a duration associated with the second portion, or an offset associated with the second portion.

21. The UE of claim 20, wherein the COT sharing information comprises the first ED threshold, and wherein the UE further comprises:
means for selecting between the first ED threshold or a second ED threshold different from the first ED threshold.

22. The UE of claim 20, wherein the COT sharing information comprises the offset, and wherein the UE further comprises:
means for determining the second portion of the COT based on the offset.

23. The UE of claim 22, wherein the offset is based on a second FBE frame of the BS different from the first FBE frame of the UE.

24. The UE of claim 22, wherein the offset is based on the first FBE frame of the BS.

25. The UE of claim 19, further comprising:
means for receiving, from the BS, a configuration for the first FBE frame.

26. The UE of claim 19, further comprising:
means for receiving, from the BS,
the DCI.

27. The UE of claim 19, wherein the means for transmitting the uplink communication signal comprises:
means for transmitting the uplink communication signal including the COT sharing information; and
means for transmitting, based on a configured grant, a configured grant physical uplink shared channel (CG-PUSCH) communication signal, the CG-PUSCH communication signal including configured grant-uplink control information (CG-UCI), and the COT sharing information indicating at least one of a COT sharing energy detection (ED) threshold, an offset of the COT, a HARQ process ID, a redundancy version identifier (RVID), a new data indicator (NDI), or a modulation and coding scheme (MCS).

28. A base station (BS) comprising:
means for receiving, from a user equipment (UE), an uplink communication signal during a first portion of a COT, the COT being associated with the UE and within a first frame-based equipment (FBE) frame; and
means for transmitting, to the UE based on COT sharing information, a downlink communication signal during a second portion of the COT, wherein the second portion is non-overlapping with the first portion, wherein the COT sharing information is indicated by a hybrid automatic repeat request (HARQ) process identifier (ID) field of downlink control information (DCI).

29. The BS of claim 28, wherein the COT sharing information comprises at least one of a first energy detection (ED) threshold, a duration associated with the second portion, or an offset associated with the second portion.

30. The BS of claim 29, wherein the COT sharing information comprises the offset, and wherein the BS further comprises:
means for determining the second portion of the COT based on the offset.

31. The BS of claim 30, wherein the offset is based on a second FBE frame of the BS different from the first FBE frame of the UE.

32. The BS of claim 30, wherein the offset is based on the first FBE frame of the UE different from a second FBE frame of the BS.

33. The BS of claim 29, wherein the COT sharing information comprises the duration associated with the second portion, and wherein the BS further comprises:
means for determining the duration for the second portion based on at least one of a duration of the first FBE frame or a duration of the uplink communication signal.

34. The BS of claim 28, further comprising:
means for transmitting, to the UE,
the DCI.

35. The BS of claim 28, wherein the means for receiving the uplink communication signal comprises:
means for receiving the uplink communication signal including the COT sharing information; and
means for receiving, based on a configured grant, a configured grant physical uplink shared channel (CG-PUSCH) communication signal, the CG-PUSCH communication signal including configured grant-uplink control information (CG-UCI), and the COT sharing information indicating at least one of a COT sharing energy detection (ED) threshold, an offset of the COT, a HARQ process ID, a redundancy version identifier (RVID), a new data indicator (NDI), or a modulation and coding scheme (MCS).

* * * * *